United States Patent
Ye et al.

(10) Patent No.: US 8,005,027 B2
(45) Date of Patent: Aug. 23, 2011

(54) METHOD AND APPARATUS FOR MULTICASTING WITH FEEDBACK INFORMATION

(75) Inventors: Chunxuan Ye, King of Prussia, PA (US); Alexander Reznik, Titusville, NJ (US); Yogendra C. Shah, Exton, PA (US); Philip J. Pietraski, Huntington Station, NY (US); Robert A. DiFazio, Greenlawn, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 869 days.

(21) Appl. No.: 11/971,161

(22) Filed: Jan. 8, 2008

(65) Prior Publication Data

US 2008/0181163 A1 Jul. 31, 2008

Related U.S. Application Data

(60) Provisional application No. 60/883,954, filed on Jan. 8, 2007.

(51) Int. Cl.
*H04B 7/005* (2006.01)
(52) U.S. Cl. ....................................... 370/278
(58) Field of Classification Search .......... None
See application file for complete search history.

(56) References Cited

U.S. PATENT DOCUMENTS

| | | | |
|---|---|---|---|
| 6,505,253 B1 * | 1/2003 | Chiu et al. | 709/235 |
| 6,614,366 B2 * | 9/2003 | Luby | 341/50 |
| 7,068,729 B2 | 6/2006 | Shokrollahi et al. | |
| 7,161,978 B2 * | 1/2007 | Lu et al. | 375/219 |
| 2001/0055317 A1 * | 12/2001 | Kajizaki et al. | 370/474 |
| 2003/0002465 A1 * | 1/2003 | Glendining et al. | 370/337 |
| 2003/0117992 A1 * | 6/2003 | Kim et al. | 370/349 |
| 2005/0265333 A1 | 12/2005 | Coffey et al. | |
| 2006/0146822 A1 | 7/2006 | Kolakowski et al. | |
| 2006/0240766 A1 | 10/2006 | Wilde | |
| 2007/0127521 A1 * | 6/2007 | Sandell et al. | 370/466 |

FOREIGN PATENT DOCUMENTS

| | | |
|---|---|---|
| EP | 1 515 474 | 3/2005 |
| EP | 1 722 506 | 11/2006 |
| WO | 01/37480 | 5/2001 |
| WO | 2004/023736 | 3/2004 |

OTHER PUBLICATIONS

Luby, Michael "LT Codes", *Proceedings of the ACM Symposium on Foundations of Computer Science*, 2002.

Shokrollahi, Amin "Raptor Codes", Proceedings of the International Symposium on Information Theory, 2004.

(Continued)

*Primary Examiner* — Chi H Pham
*Assistant Examiner* — Fan Ng
(74) *Attorney, Agent, or Firm* — Volpe and Koenig, P.C.

(57) ABSTRACT

A method for multicasting a packet begins by providing a buffer for each of two user equipments (UEs) in communication with a base station. A determination is made whether there is a previously unsent packet at the base station. A second determination is made whether both UE buffers are non-empty. A non-empty buffer is flushed if there is no previously unsent packet and if one of the buffers is non-empty. A packet is selected to be transmitted if there is a previously unsent packet or if both buffers are non-empty. The buffers are updated based on feedback received from the UEs.

15 Claims, 10 Drawing Sheets

OTHER PUBLICATIONS

3rd Generation Partnership Project; Technical Specification Group Radio Access Network; "User Equipment (UE) radio transmission and reception (FDD)" (Release 5); 3GPP TS 25.101 V5.11.0 (Jun. 2004).

3rd Generation Partnership Project; Technical Specification Group Radio Access Network; "User Equipment (UE) radio transmission and reception (FDD)" (Release 5); 3GPP TS 25.101 V5.20.0 (Dec. 2006).

3rd Generation Partnership Project; Technical Specification Group Radio Access Network; "User Equipment (UE) radio transmission and reception (FDD)" (Release 6); 3GPP TS 25.101 V6.10.0 (Dec. 2005).

3rd Generation Partnership Project; Technical Specification Group Radio Access Network; "User Equipment (UE) radio transmission and reception (FDD)" (Release 6); 3GPP TS 25.101 V6.14.0 (Dec. 2006).

3rd Generation Partnership Project; Technical Specification Group Radio Access Network; "User Equipment (UE) radio transmission and reception (FDD)" (Release 6); 3GPP TS 25.101 V6.15.0 (Sep. 2007).

3rd Generation Partnership Project; Technical Specification Group Radio Access Network; "User Equipment (UE) radio transmission and reception (FDD)" (Release 7); 3GPP TS 25.101 V7.6.0 (Dec. 2006).

3rd Generation Partnership Project; Technical Specification Group Radio Access Network; "User Equipment (UE) radio transmission and reception (FDD)" (Release 7); 3GPP TS 25.101 V7.10.0 (Dec. 2007).

3rd Generation Partnership Project; Technical Specification Group Radio Access Network; "User Equipment (UE) radio transmission and reception (FDD)" (Release 8); 3GPP TS 25.101 V8.1.0 (Dec. 2007).

Lee et al., "Performance improvements of wireless IP multicast conference system based on designated receivers", IEEE International Conference on Communications, vol. 2, pp. 807-811 (Jun. 1998).

Sanjoy et al., "Reliable Multicast Transport Protocol (RMTP)," IEEE Journal on Selected Areas in Communications, vol. 15, No. 3 (Apr. 1997).

Yamauchi, "Reliable multicast over the mobile packet radio channel," pp. 366-371 (May 6, 1990).

* cited by examiner

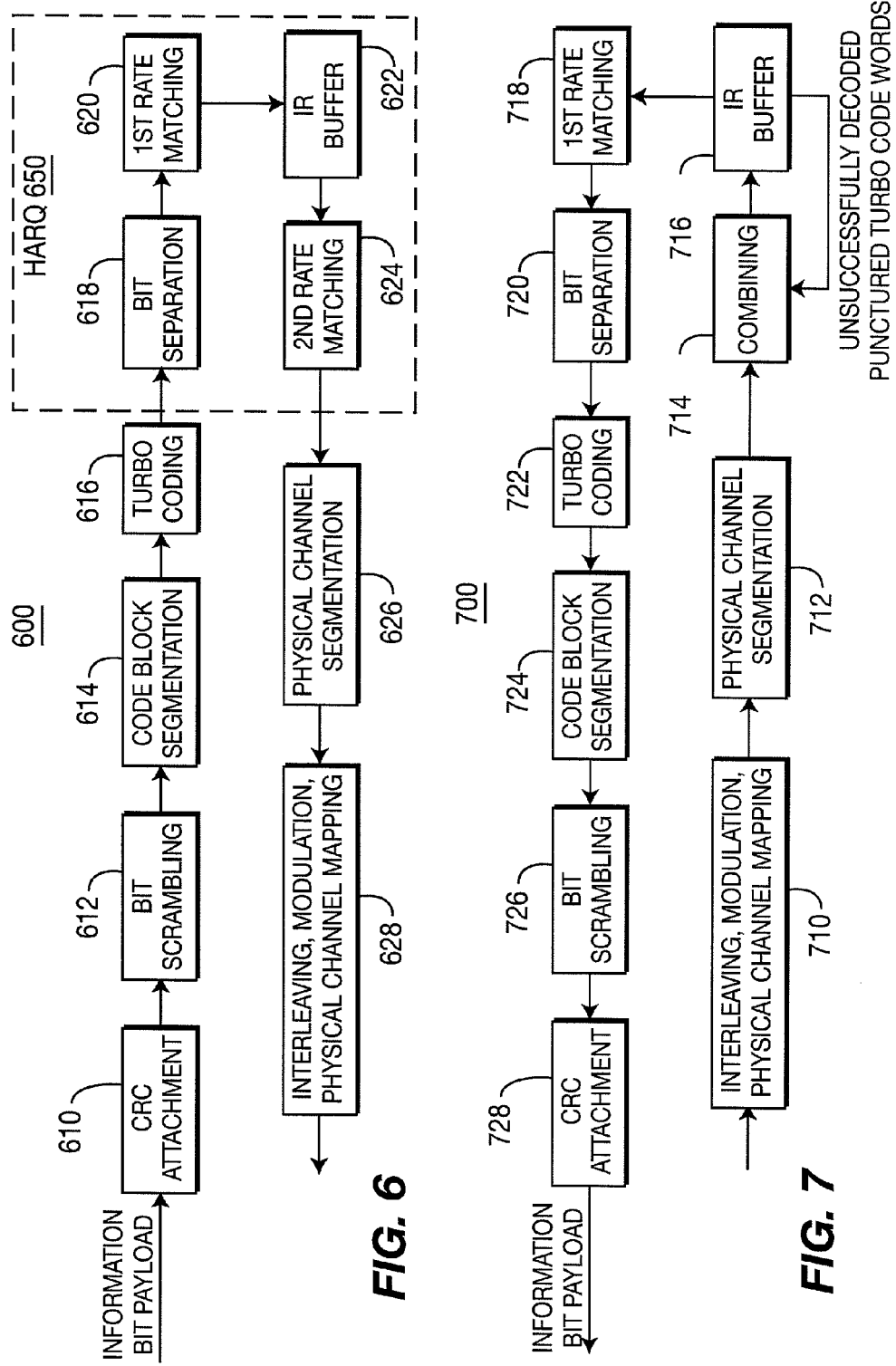

METHOD AND APPARATUS FOR MULTICASTING WITH FEEDBACK INFORMATION

CROSS REFERENCE TO RELATED APPLICATION

This application claims the benefit of U.S. provisional Application Ser. No. 60/883,954, filed Jan. 8, 2007, which is incorporated by reference as if fully set forth.

FIELD OF DISCLOSURE

The present disclosure is related to wireless communication systems.

BACKGROUND

In wireless communication systems, multicasting allows a transmitter to send a packet only once, even if it needs to be delivered to a large number of receivers. When a source packet is sent out via multicasting, it is typical that not all the targeted receivers will recover the source packet. In existing protocols, when all receivers do not recover the source packet, the packet must be retransmitted. The practice of retransmitting the source packets creates inefficiency in wireless systems because some receivers recover data that they already possess.

Recently developed techniques, commonly known as Rateless Codes (RCs; also known as Fountain Codes) avoid this inefficiency by transmitting "derived packets" which are linear combinations of original packets. Rateless coding has been described and analyzed in a number of previous works, including: M. Luby, "LT codes," in *Proceedings of the ACM Symposium on Foundations of Computer Science*, 2002; A. Shokrollahi, "Raptor codes," in *Proceedings of the International Symposium on Information Theory*, 2004; U.S. Pat. No. 6,614,366 entitled "Information additive code generator and decoder for communication systems"; and U.S. Pat. No. 7,068,729 entitled "Multi-stage code generator and decoder for communication systems". While such techniques are known in systems where no feedback from receivers to the sender is available, their application in systems with feedback, including Automatic Repeat Request (ARQ) and Hybrid-ARQ (HARQ) protocols is not well known.

To better understand the state of the art, a wireless communication system model 100 as shown in FIG. 1 is described. Assume a base station 110 wishes to send a number of source packets $p_1, \ldots, p_k$ to m user equipments (UEs) 120. The source packets are of the same size and the transmission is by means of multicast. The wireless channels between the base station 110 and the m UEs 120 are memoryless erasure channels that are independent of each other. Let $e_i$, for $i=1, \ldots, m$, denote the erasure rate of the channel between the base station 110 and UE i 120. In other words, the probability that UE i 120 receives a packet is $1-e_i$, and the probability that UE i 120 does not receive a packet is $e_i$. A packet is considered as missing if a UE is unable to recover every bit in the packet using the physical layer forward error correction technologies. Each UE 120 is able to send a single bit acknowledgement/negative acknowledgement (ACK/NACK) feedback to the base station, informing it whether the packet is received or not. Without loss of generality, it is assumed that the base station 110 sends a packet at the first part of a timeslot, and the UEs 120 send the ACK/NACK at the second part of the timeslot.

The existing protocols without RCs are now described. Protocol 1 describes the existing protocol on the wireless communication system 100 with only two UEs (i.e., m=2 in FIG. 1), while Protocol 1a extends Protocol 1 to an arbitrary number of UEs.

Protocol 1

As shown in FIG. 1, a base station 110 retransmits the same packet until it receives at least one ACK from each UE 120 for this packet. It is noted that a UE may ACK a source packet more than once, when the source packet is retransmitted. Then, the base station 110 sends a new packet. Protocol 1 ensures that all UEs 120 receive all source packets.

To evaluate the performance of Protocol 1, the average (expected) overhead is computed. Overhead is the ratio of the total number of packet transmissions over the number of source packets. By definition, overhead is a number no less than 1, and a smaller overhead is desirable. According to Protocol 1, the number of transmissions of the same packet until both UEs receive it is equal to the larger of the transmissions of the same packet if they were independently sent to each UE. This can be mathematically expressed in the following description that can also be applied to multiple UEs.

Let Z be the number of transmissions of the same packet until both UEs receive it. Then, $Z=\max\{X,Y\}$, where X and Y are independent geometric random variables with respective parameters $1-e_1$ and $1-e_2$. Specifically, for x, y=1, 2, ... $Pr(X=x)=(1-e_1)e_1^{x-1}$ and $Pr(Y=y)=(1-e_2)e_2^{y-1}$. The total number of packets sent in Protocol 1 such that all k source packets are received by both UEs is given by $$\sum_{i=1}^{k} Z_i \qquad \text{Equation (1)}$$

where $Z_i$ are independent random variables with the same distribution as Z. Hence, the total number can be written as $$\sum_{i=1}^{k} \max\{X_i, Y_i\} \qquad \text{Equation (2)}$$

where $X_1, \ldots, X_k$ are independent geometric random variables with parameter $1-e_1$, and $Y_1, \ldots, Y_k$ are independent geometric random variables with parameter $1-e_2$.

As shown by Equation (1), the average number of packets sent in Protocol 1 is given by kE(Z), and the expected overhead of Protocol 1 is given by E(Z). It can be shown that $$E(Z) = \frac{1}{1-e_1} + \frac{1}{1-e_2} - \frac{1}{1-e_1 e_2} \qquad \text{Equation (3)}$$

Protocol 1 can be applied to the multicast model with an arbitrary number of UEs as follows.

Protocol 1a

In Protocol 1a, Protocol 1 is extended to multiple UEs. In Protocol 1a, the base station retransmits the same packet until it receives at least one ACK from every UE for this packet. Then, the base station sends a new packet. Protocol 1a ensures that every UE receives all source packets. Performance of this protocol is evaluated in a way similar to the approach taken for two UEs.

The present disclosure includes the use of rateless coding protocols and the efficiencies these deliver in systems where feedback information does exist. Having feedback information about which packets were and were not received can deliver significant additional advantages not realized in existing protocols. With the current availability of feedback data, new multicasting protocols are needed to allow for greater system efficiency.

SUMMARY

Multicasting packet data in systems where receivers can provide feedback to the common transmitter is disclosed herein. A method for multicasting packet data when no feedback exists has been proposed in existing protocols. These techniques are generally referred to as Rateless Coding (RC) algorithms. However, having the feedback, and thus information about which packets were and were not received, can deliver additional advantages not realized by existing techniques.

The present disclosure includes a framework for improving the existing RC concepts to incorporate receiver feedback. Several specific implementations are developed and illustrated by demonstrating how multicast over the existing 3GPP HSDPA system can be improved. While these concepts are described for HSPA, they can be extended to any system with feedback by those skilled in the art, including 3GPP LTE.

BRIEF DESCRIPTION OF THE DRAWINGS

A more detailed understanding of the disclosure may be had from the following description, given by way of example and to be understood in conjunction with the accompanying drawings wherein:

FIG. 6 is a diagram of an High Speed Downlink Shared Channel (HS-DSCH) channel encoding chain;

FIG. 7 is a diagram of an HS-DSCH channel decoding chain;

DETAILED DESCRIPTION

Figure 1:
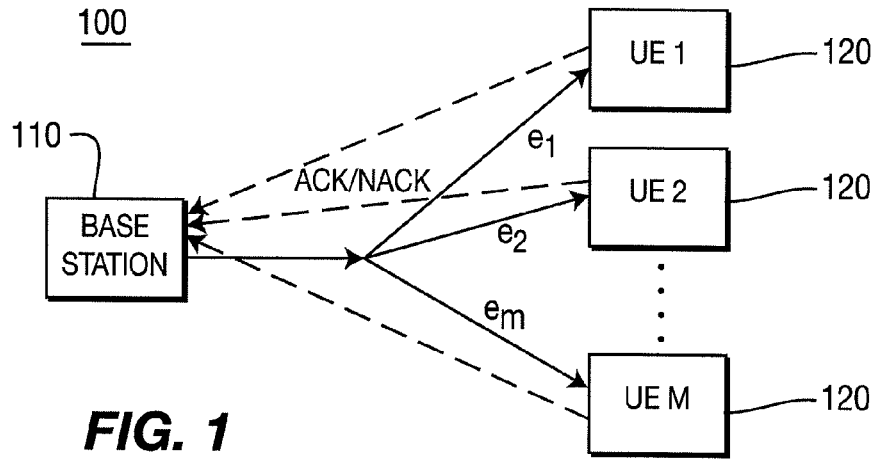
FIG. 1 shows a multicast model with an arbitrary number of UEs.

Although the features and elements of the present disclosure are described in different protocols, each feature or element can be used alone (without the other features and elements of the protocols) or in various combinations with or without other features and elements.

When referred to hereafter, the term "user equipment (UE)" includes, but is not limited to, a wireless transmit/receive unit (WTRU), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

New transmission protocols are described which provide performance (overhead) improvements. The protocols as applied to two UEs are presented first. Then extensions of these protocols to multiple UEs are presented.

Recall that in rateless coding, all packets are effectively retransmitted several times through the rateless coding operation. While justified when no feedback is presented, such an operation is not necessary in the presence of feedback. The general framework for the protocols described herein is as follows:

First send one instance of each data packet in the usual fashion. Alternatively, some repetition/rateless coding may be applied a priori to ensure reliable delivery of most packets. However, the amount of such coding (the "expansion introduced by the code") should be limited and smaller than would be used in the no-feedback case.

Buffer the packets and collect information regarding the packets that were not received and (if available) which UEs missed which packets.

Now use rateless coding to efficiently retransmit only those packets that were not received in such a way that all UEs have a good likelihood of decoding the packets.

By combining rateless coding with feedback information, greater transmission efficiency can be achieved.

It should be noted that a high level system utilizes one or several "packet coders" which each take N input packets and produce a single output packet. For simplicity, the protocols below utilize the XOR coder which operates on packets each having the same number of bits. Such a packet coder simply bitwise XORs the bits in different packets that occupy the same bit position. However, such a restriction is easily relaxed in the following ways: the packets do not have to be of equal length and a coding operation different from a simple XOR may be used.

The usage of an XOR coder is preferred, as it is used in the pre-existing designs utilizing RC concepts. However, more complex coders (e.g., binary block coders) may be used. Such coders may output a single packet, as the XOR coder does, or a set of output packets (as in, for example, a Reed-Solomon code operating on byte-input (8-bit packets) and outputting byte outputs). As used herein, coders outputting more than one packet can either be treated as an array of coders or a single output may be selected for use.

The packet length issue, however, needs to be addressed. In communication systems, the packets often do not have the same length and the XOR coder is not defined in this case. When this occurs, the packets need to be rate-matched to be the same length. The simplest method is to pad the shorter packets with known bits (often with zeros, but any bit-string known at the receiver may be used). An alternative approach may involve using more complex techniques, such as concatenation and segmentation of packets or integration of the XOR operation into other operations, such as channel coding, etc.

Protocol 2

Figure 2:
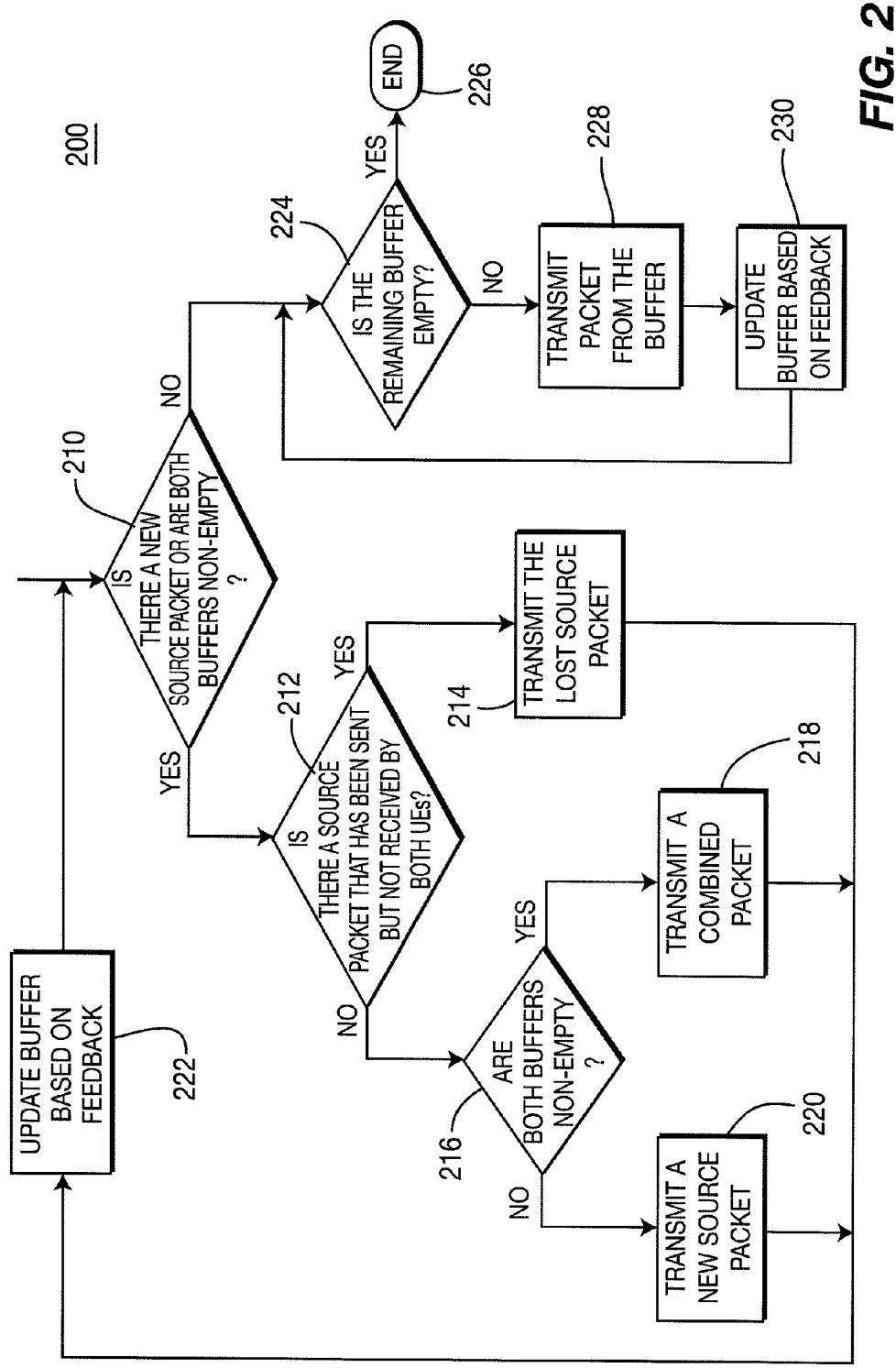
FIG. 2 is a flow chart of a transmission protocol with two UEs.

FIG. 2 is a flow chart of a transmission protocol 200 ("Protocol 2") which is described in terms of the multicast model with two UEs. Protocol 2 has a lower transmission overhead than Protocol 1. By combining RC and feedback, greater efficiency in terms of overhead is achieved.

In Protocol 2, the base station sets up a buffer for each UE, for storing the lost packets for the UE. A "lost packet" is a packet that has been sent, but not received by the UE. The method 200 begins by determining whether there is a new source packet (meaning that it has not been sent before) or whether both buffers are non-empty (step 210). If this is the case, then a determination is made whether there is a source packet which has been sent, but not received, by both UEs (step 212). If such a source packet exists, the base station transmits this lost source packet (step 214). If such a source packet does not exist (step 212), then a determination is made whether the buffers for both UEs are non-empty (step 216). If both UE buffers are non-empty, then the base station transmits a combined packet, which is a combination of two source packets in the buffers (step 218). If at least UE buffer is empty (step 216), the base station transmits a new source packet (step 220). Based on the ACK/NACK feedback received from the UEs, the base station updates both buffers (step 222).

If there does not exist a new source packet and at least one buffer is empty, a determination is made whether the other buffer is empty (step 224). If the other buffer is empty, the protocol terminates (step 226). If the other buffer is non-empty, a packet from the buffer is transmitted (step 228) and the buffer is updated based on feedback information (step 230). This section of Protocol 2 (steps 224-230) flushes out any packets remaining in the buffers.

There are two stages in Protocol 2: the "normal transmission stage" and the "completing a burst transmission stage". If there exists a new source packet which has not been sent before or both buffers are non-empty, then the protocol is in the "normal transmission stage". Otherwise, the protocol is in the "completing a burst transmission stage".

In the normal transmission stage, in each timeslot, the base station multicasts a packet to both UEs, pursuant to three rules of order.

Rule 1: If both UEs informed the base station of the loss of a packet in the last timeslot, the base station retransmits that packet in the current timeslot. When receiving an ACK from one UE and a NACK from the other UE, the base station stores the currently sent packet in the buffer for the latter UE.

Rule 2: If the buffers for both UEs are non-empty, the base station transmits the exclusive or (XOR) of the first packets in these two buffers. It is noted that only one of the two component packets of the combined packet is unknown to each UE. Hence, upon receiving a combined packet, each UE is able to recover its unknown packet by XORing the combined packet with one of its previously received packets. When receiving an ACK from one or both UEs, the base station removes the first packet from the appropriate buffer(s).

Rule 3: The base station transmits a new source packet which has not been previously sent. When receiving an ACK from one UE and a NACK from the other UE, the base station stores the currently sent packet in the buffer for the latter UE.

In the completing a burst transmission stage, at the end of a long transmission burst, at least one UE has been able to receive all the source packets. If the other UE has not yet received all the source packets, i.e., the buffer for that UE is non-empty, then the base station flushes out the buffer for that UE. Specifically, the base station keeps retransmitting the same packet from the buffer until it receives an ACK from the UE. Then, the base station sends the next remaining packet in the buffer.

Performance Evaluation of Protocol 2

The expected overhead of Protocol 2 is computed below. The packets sent by Rule 3 in Protocol 2 are referred to as "regular packets", and the other packets that are sent are referred to as "repair packets". The number of regular packets is equal to the number of source packets k.

According to Protocol 2, if at the end of the normal transmission stage one of the UEs does not recover all source packets, then all repair packets in both the normal transmission stage and the completing a burst transmission stage help this UE recover its lost packets. Since every repair packet contains one packet of unknown information for this UE, this packet can be regarded as a retransmission packet. Therefore, the total number of transmissions in Protocol 2 is equal to the larger of the number transmissions of the same k packets independently sent to each UE. This can be mathematically expressed as follows.

Let $X_1, \ldots, X_k$ be independent geometric random variables with parameter $1-e_1$ and let $Y_1, \ldots, Y_k$ be independent geometric random variables with parameter $1-e_2$. Then the total number of packets sent in Protocol 2 is given by $$\max\left\{\sum_{i=1}^{k} X_i, \sum_{i=1}^{k} Y_i\right\} \quad \text{Equation (4)}$$

Comparing Equation (2) with Equation (4), the total number of packets sent in Protocol 2 is always less than the total number of packets sent in Protocol 1.

If the erasure rates of the two independent channels are different, for example, $e_1 > e_2$, then $$E\left(\sum_{i=1}^{k} X_i\right) = \frac{k}{1-e_1} > \frac{k}{1-e_2} = E\left(\sum_{i=1}^{k} Y_i\right).$$

It follows from the weak law of large numbers that as $k \to \infty$, the probability that $$\sum_{i=1}^{k} X_i$$

is larger than $$\sum_{i=1}^{k} Y_i$$

goes to 1. Hence, it follows from Equation (4) that the average number of packets sent in Protocol 2 can be approximated by the mean of $$\sum_{i=1}^{k} X_i, \text{ i.e., } \frac{k}{1-e_1}.$$

Generally, the expected overhead of Protocol 2 is approximated by $$\frac{1}{1-\max\{e_1, e_2\}}$$ Equation (5)

This is the minimum overhead that can be achieved. Consider the case where the base station sends source packets only to the UE through a memoryless erasure channel with an erasure rate of max $\{e_1,e_2\}$. From the information-theoretic viewpoint, the minimum possible overhead for this model is $$\frac{1}{1-\max\{e_1, e_2\}}$$

for the reliable transmission, and therefore the overhead of Protocol 2 is near optimal.

The above analyses show that Protocol 2 makes the transmissions of the same data to the UE with a better channel condition for free, meaning that the same number of transmissions as that used for transmitting the source packets to the UE with a worse channel condition are used without any additional overhead required. The same results are obtained for the identical channel condition case, i.e., $e_1=e_2$.

It is noted that although Protocol 2 is described in the context of only two UEs, it should be clear that this protocol extends to m UEs. The decoding operation is the same as in the prior art for RC coding. It should be clear from the prior art that for m UEs with error rates $e_1, \ldots e_m$, the theoretical minimum overhead of $$\frac{1}{1-\max_{i=1,\ldots,m}\{e_i\}}$$

can be approached.

Variations of Protocol 2

As shown above, Protocol 2 achieves the minimum possible overhead for the multicast model with two UEs. Another criterion that can be used to judge a protocol is latency.

Although Protocol 1 results in a high overhead, it has a better latency as compared to Protocol 2. This is because in Protocol 1, the base station ensures the reception of a source packet by both UEs before the next source packet is sent. All source packets are received by both UEs in their original order.

Protocol 2 has a worse latency performance than Protocol 1 because Protocol 2 deliberately introduces delays. The packets which are not received are not immediately re-sent. Instead, they are stored in the buffers for later delivery.

Protocols 1 and 2 represent two extreme cases, one with the best latency but a worse overhead, the other with the best overhead but a worse latency.

Protocol 3

Protocol 3 represents a balance between overhead and latency, and is based on Protocol 2. According to Protocol 3, there is a predetermined maximum delay, which is represented by an integer D. If the first packet in a UE buffer is the $D^{th}$ packet ahead of the latest sent source packet, the base station tries to send this first packet immediately.

In Protocol 3, the base station sets up a buffer for each UE. Each buffer stores the packets that have been sent, but not received by the corresponding UE.

There are two stages in Protocol 3: the "normal transmission stage" and the "completing a burst transmission stage". If there exists a new source packet which has not been sent before or both buffers are non-empty, then the protocol is in the "normal transmission stage". Otherwise, the protocol is in the "completing a burst transmission stage".

In the normal transmission stage, in each timeslot, the base station multicasts a packet to both UEs according to the following rules of order.

Rule 1: same as Protocol 2, Rule 1.
Rule 2: same as Protocol 2, Rule 2.
Rule 3: If a buffer is non-empty and the first packet in this buffer is the $D^{th}$ packet ahead of the latest sent source packet, then the base station transmits this packet. When receiving an ACK from the appropriate UE, the base station removes this packet from the buffer.
Rule 4: same as Protocol 2, Rule 3.

In the completing a burst transmission stage, the rules are the same as in Protocol 2.

If the maximum delay D is set to infinity, then Protocol 3 is the same as the Protocol 2. Each UE may have a different maximum delay requirement. For example, $D_1$ and $D_2$ denote the maximum delays allowed by UE 1 and UE 2, respectively. Rule 3 is adjusted based on the delay requirement for the UE.

Although this protocol is described for two UEs, extensions to an arbitrary number of UEs should be clear.

Besides overhead and latency, another criterion used to evaluate a protocol is its memory usage. It is noted that no constraints are imposed on the buffer sizes in Protocol 2. This may result in a large memory usage, especially in the case where the number of source packets is large and one erasure channel has a better condition than the other. Thereby, to avoid a memory outage, the base station should determine a maximum buffer size or buffer capacity. If a buffer reaches this capacity, it should be cleared up immediately.

Protocol 4

In Protocol 4 the base station sets up a buffer for each UE. Each buffer stores the packets that have been sent, but not received by the corresponding UE. Both buffers are initially empty and the base station predetermines a buffer capacity C. Although this protocol is described for two UEs, extensions to an arbitrary number of UEs should be clear.

There are two stages in Protocol 4: the "normal transmission stage" and the "completing a burst transmission stage". If there exists a new source packet which has not been sent before or both buffers are non-empty, then the protocol is in the "normal transmission stage". Otherwise, the protocol is in the "completing a burst transmission stage".

In the normal transmission stage, in each timeslot, the base station multicasts a packet to both UEs according to the following rules of order.

Rule 1: same as Protocol 2, Rule 1.
Rule 2: same as Protocol 2, Rule 2.
Rule 3: If a buffer reaches the buffer capacity, then the base station transmits the first packet in the buffer. When receiving an ACK from the appropriate UE, the base station removes this packet from the buffer.
Rule 4: same as Protocol 2, Rule 3.

In the completing a burst transmission stage, Protocol 4 operates the same as Protocol 2.

Protocol 4 reduces to Protocol 2 if the buffer capacity is set to infinity. The capacities of both buffers are set to be the same in Protocol 4. However, given the total buffer size limitation, the uniform capacity allocation scheme may not be the best one in terms of the resulting overhead. The base station predetermines the buffer capacity $C_i$ for UE i, i=1, 2 with $C_1+C_2 \leq 2C$. Then Rule 3 should be adjusted accordingly.

Compared with Protocol 2, both Protocol 3 and Protocol 4 sacrifice their overhead performance to meet either the latency requirements or the memory restrictions. Protocol 3 and Protocol 4 may be combined to meet both the latency requirements and the memory restrictions.

Variations in Combining Packets

It is assumed that all source packets are of the same size, which makes it easy to XOR the packets in Protocols 2-4. When all the source packets are not the same size, the XOR operation is not trivial. There are several ways of combining differently sized packets. It is noted that these methods can also be used when the packets are the same size and to combine more than two packets.

1. XOR part of a packet with another. For example, suppose $p_1$ is a packet of $l_1$ bits and $p_2$ is a packet of $l_2$ bits, where $l_1 > l_2$. To combine packets $p_1$ and $P_2$, zero-pad packet $p_2$ to $l_1$ bits. The resulting packet is XORed with packet $p_1$.

2. Perform the summation and modulo operations in GF(q), with q>2.

3. Perform the summation in the ring of positive integers modulo some maximal value.

4. Perform repetition of bits in the packet with the shorter length to match the larger packet and then XOR the resulting packets.

Those skilled in the art may be able to conceive of other alternate combining methods.

Protocols for Multiple UEs

The above protocols can be applied, with modifications, from a two UE scenario to a multiple UE scenario.

Protocol 5

Protocol 5 is based on Protocol 4. In Protocol 5 the base station sets up an index buffer for each UE. Each index buffer records the indices of packets that have been sent, but not received by the corresponding UE. The base station also predetermines a buffer capacity C. Let $P_{i,j}$ denote the packet index recorded at the $j^{th}$ position of the $i^{th}$ index buffer (i.e., the index buffer for UE i). An index buffer i is said to be full if $P_{i,j} > 0$, for $1 \leq j \leq C$. An index buffer i is said to be empty if $P_{i,j} = 0$, for $1 \leq j \leq C$. Initially, all index buffers are empty.

Figure 3:
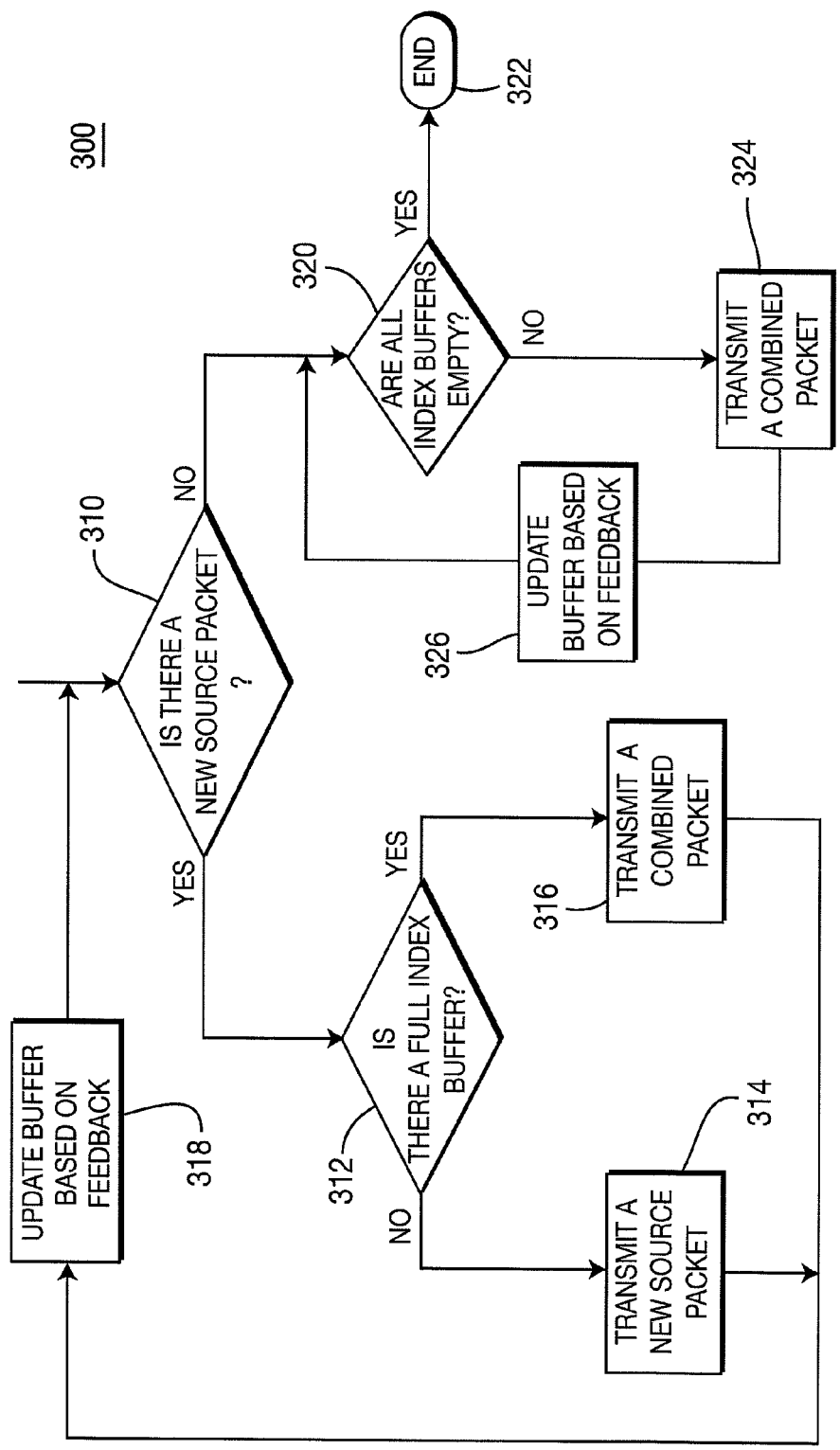
FIG. 3 is a flow chart of a transmission protocol with multiple UEs.

FIG. 3 is a flow chart of Protocol 5 300. The protocol 300 begins by determining whether there is a new source packet which has not yet been sent (step 310). If such a new source packet exists, then a determination is made whether there is a full index buffer (step 312). If none of the index buffers are full, then the base station transmits a new source packet (step 314). If one or more index buffers are full (step 312), then the base station transmits a combined packet which is a combination of several source packets with indices in the buffers (step 316). Based on the ACK/NACK feedback from the UEs, the base station updates the buffers (step 318).

If there is no new source packet (step 310), the base station flushes out the buffers. To flush out the buffers, a determination is made whether all index buffers are empty (step 320). If all the index buffers are empty, the protocol terminates (step 322). If all of the index buffers are not empty (step 320), then the base station transmits a combined packet, which is a combination of several source packets with indices in the buffers (step 324). The base station then updates the buffers based on ACK/NACK feedback received from the UEs (step 326).

There are two stages in Protocol 5: the "normal transmission stage" and the "completing a burst transmission stage". If there exists a new source packet which has not been sent before, then the protocol is in the "normal transmission stage". Otherwise, the protocol is in the "completing a burst transmission stage".

In the normal transmission stage, if none of the index buffers are full, the base station transmits a new source packet which has not been previously sent. When receiving a NACK from a UE, the base station records the index of the currently sent packet in the appropriate UE index buffer.

If one or more index buffers are full (assume the $l^{th}$ index buffer is full), the base station transmits a packet which is constructed by XORing several source packets. There are several ways of determining the indices of the set of component source packets for combining.

One method for determining the indices of the set of component source packets for combining is as follows, and is referred to as "Algorithm A".

(1) Create a set of component source packets and a set of unavailable source packets. Both sets are empty initially.

(2) Randomly select a packet which is not contained in the set of component source packets or in the set of unavailable source packets.

(3) Add the selected packet to the set of component source packets.

(4) Add all other packets in the same UE buffer with the selected packet to the set of unavailable source packets.

(5) Repeat step (2) until both sets are empty.

(6) Transmit the XOR of all the packets in the set of component source packets.

The set of component source packets contains at most one lost packet for every UE. Upon receiving an XOR-constructed packet, a UE is able to recover one of its lost packets (if any) by XORing the currently received packet with some of the previously received packets. When receiving an ACK from UEs, the base station sets the corresponding packet index from the appropriate buffers to zero.

One stop criterion for this scenario is a minimum buffer fill level, in which the algorithm will be run until all of the buffers have been reduced to a predetermined level. It is noted that one skilled in the art could derive other stop criterion for addressing all the UEs.

In the completing a burst transmission stage, until all the index buffers are empty, the base station transmits a packet which is constructed by XORing several source packets. The indices of the set of component source packets can be determined by Algorithm A. The buffer index l, used in step (1) of Algorithm A, is the one which maximizes $$\sum_{j=1}^{C} I_{P_{i,j} > 0},$$

where I is the indicator function. Upon receiving an ACK from UEs, the base station sets the corresponding packet index from the appropriate buffers to zero.

If the buffer capacity C is set to infinity, then the resulting protocol is a multiple UE extension of Protocol 2.

Because a sent source packet may not be received by several UEs, storing the packet index rather than the packet itself in the index buffers will use less memory.

There are situations (e.g., a source packet is not received by all the UEs) where only one component source packet is selected by Algorithm A. Also, it is noted that Algorithm A may not result in the smallest overhead for Protocol 5. There are several other methods of selecting component source packets from index buffers. A first method (hereinafter "Algorithm A.1") is described as follows.

(1) Select the first packet in the UE with the filled buffer and find all other UEs which are helped by transmitting this packet. A UE is "helped" when a packet in its buffer can be transmitted. Call these the "Found UEs."

(2) Ignore those UEs which have empty buffers.

(3) From the remaining UEs find the next UE with the most filled buffer and select one of its entries, which is not covered in the buffers of Found UEs. If there is no such entry, repeat this step for the remaining UEs.

(4) Find all UEs that are helped by transmitting this new packet.

(5) Repeat again from step (3) until all the UEs are addressed (i.e., either a UE has an empty buffer or the UE is a Found UE).

(6) Transmit the XOR of all the packets that have been selected.

A second method (hereinafter "Algorithm A.2") is as follows.

(1) Select the first packet in the UE with the filled buffer and find all other UEs which are helped by transmitting this packet. Call these the "Found UEs."

(2) Arbitrarily select a UE from the remaining UEs.

(2a) If there exists an entry in the buffer of the selected UE which is not covered in the buffers of the found UEs, then select this entry.

(2b) Call the selected UE a "Found UE."

(3) Find all UEs that are helped by transmitting this new packet.

(4) Repeat step (3) until all the UEs are "Found UEs". This will be achieved when at least one packet has been transmitted from all UE buffers.

(5) Transmit the XOR of all the packets which have been selected.

A third method (hereinafter "Algorithm A.3") is as follows.

(1) Ignore those UEs that have empty buffers.

(2) Select the first packet in the UE with the least filled buffer and find all other UEs which are helped by transmitting this packet. Call these the "Found UEs."

(3) From the remaining UEs, find the next UE with the least filled buffer and select one of its entries, which is not covered in the buffers of the Found UEs. If there is no such entry, repeat this step for the remaining UEs.

(4) Find all UEs that are helped by transmitting this new packet.

(5) Repeat again from step (3) until all the UEs are addressed.

(6) Transmit the XOR of all the packets that have been selected.

The capacities of all UE index buffers are set to be the same in Protocol 5. Given the total buffer size limitation, the uniform capacity allocation scheme in Protocol 5 may not be the best in terms of the resulting overhead. The base station predetermines the index buffer capacity $C_i$ for UE i, for i=1, ..., m, with $$\sum_{i=1}^{m} C_i \leq mC.$$

An index buffer i is "full" if $P_{i,j}>0$, for $1 \leq j \leq C_i$. Algorithms A, A.1, A.2, and A.3 should be adjusted accordingly.

Simulation results comparing the overheads of Protocol 1a and Protocol 5 are given below. The results show that Protocol 5 has a better overhead performance than Protocol 1a.

Variations on the Multiple UE Protocol

The latency factor is not considered in Protocol 5. Although the activity to avoid the buffer outage in Protocol 5 may implicitly reduce the latency, an explicit activity is often needed to meet the latency requirements. To this end, Protocol 5 can be modified.

Protocol 6

Protocol 6 is based on Protocol 3. In Protocol 6 the base station sets up an index buffer for each UE. Each index buffer records the indices of packets that have been sent, but not been received by the corresponding UE. There is a predetermined maximum delay D. Let $P_{i,j}$ denote the packet index recorded at the $j^{th}$ position of the $i^{th}$ index buffer (i.e., the index buffer for UE i). An index buffer i is said to be "old" if $P_{i,j}>0$ such that the difference between $P_{i,j}$ and the index of the latest sent source packet is larger than D. Initially, all index buffers are set as empty, i.e., $P_{i,j}=0$.

There are two stages in Protocol 6: the "normal transmission stage" and the "completing a burst transmission stage". If there exists a new source packet which has not been sent before, then the protocol is in the "normal transmission stage". Otherwise, the protocol is in the "completing a burst transmission stage".

In the normal transmission stage, if none of the index buffers are old, the base station transmits a new source packet which has not been previously sent. When receiving a NACK from a UE, the base station records the index of the currently sent packet in the appropriate UE index buffer. If one or more index buffers are old (assume the $l^{th}$ index buffer is old and $P_{l,1}$ is the oldest packet in this index buffer), the base station transmits a packet which is constructed by XORing several source packets. Algorithm A in Protocol 5 may be used; additional methods are described below.

It is noted that the set of component source packets contains at most one lost packet for every UE. Upon receiving an XOR-constructed packet, a UE is able to recover one of its lost packets (if any) by XORing the currently received packet with some of its previously received packets. When receiving an ACK from UEs, the base station sets the corresponding packet index from the appropriate buffers to zero.

There are several ways of determining the indices of the set of component source packets for combining. Algorithm A in Protocol 5 may not result in the lowest overhead for Protocol 6. Algorithms A.1, A.2, and A.3 in Protocol 5 are all applicable to Protocol 6. There is an additional algorithm that may be used ("Algorithm B"), which is set forth below.

(1) Select the oldest packet in the UE buffers and find all the UEs which are helped by transmitting this packet. Call these the "Found UEs".

(2) Ignore those UEs which have empty buffers.

(3) From the remaining UE buffers, find the next oldest packet which is not covered in the buffers of the Found UEs.

(4) Find all UEs which are helped by transmitting this packet.

(5) Repeat again from step (3) until all such packets are addressed.

(6) Transmit the XOR of all the packets which have been selected.

The set of component source packets contains at most one lost packet for every UE. Hence, upon receiving an XOR-constructed packet, a UE is able to recover one of its lost packets (if any) by XORing the currently received packet with some of its previously received packets.

In the completing a burst transmission stage, whenever not all the index buffers are empty, the base station transmits a packet which is constructed by XORing several source packets. The indices of the set of component source packets can be determined by Algorithm B. The buffer index l (used in step (1) of Algorithm B) is the index which contains the smallest positive integer in the set $\{P_{i,j} \in \{1, \ldots, m\}\}$. Upon receiving an ACK from UEs, the base station sets the corresponding packet index from the appropriate buffers to zero.

Each UE may have a different maximum delay requirement. Let $D_i$ denote the maximum delay allowed by UE i. An index buffer i is "old" if $P_{i,j} > 0$ such that the difference between $P_{i,j}$ and the index of the latest sent source packet is larger than $D_i$. Algorithm B should be adjusted accordingly.

Both Protocol 5 and Protocol 6 sacrifice their overhead performance to meet either the memory restrictions or the latency requirements. Protocol 5 and Protocol 6 can be combined to meet both the memory restrictions and the latency requirements.

It is noted that all the protocols proposed above use UE-based buffers. It is also possible to use packet-based buffers, which may already exist as part of most system designs. Specifically, the base station sets up a buffer for each source packet sent. The contents of a buffer are the list of indices of UEs that do not receive this source packet on the first attempt.

Protocol 7

In Protocol 7 the base station sets up an index buffer for each source packet sent. Each index buffer records the indices of UEs that do not receive the corresponding source packet. The base station also predetermines a buffer capacity C. Let $P_{i,j}$ denote the UE index recorded at the $j^{th}$ position of the $i^{th}$ UE index buffer (i.e., the index buffer for the $i^{th}$ source packet). Initially, all index buffers are empty. Although this protocol is described for two UEs, extensions to an arbitrary number of UEs should be clear.

There are two stages in Protocol 7: the "normal transmission stage" and the "completing a burst transmission stage". If there exists a new source packet which has not been sent before, then the protocol is in the "normal transmission stage". Otherwise, the protocol is in the "completing a burst transmission stage".

In the normal transmission stage, if the index buffers do not reach the capacity C, the base station transmits a new source packet which has not been previously sent. When receiving a NACK from a UE, the base station records the index of this UE in the current UE index buffer. If the index buffers reach the capacity C, then the base station transmits a packet which is constructed by XORing several source packets. Besides the Algorithms A, A.1, A.2, A.3, and B described above, the following method ("Algorithm C") can also be used to determine the set of component source packets for combining.

(1) Select the source packet with the most filled buffer and find all the UEs which are helped by transmitting this packet. Call these the "Found UEs".

(2) Ignore those source packets which have empty buffers.

(3) From the remaining source packets, find one with the most filled buffer and all entries in the buffer that are not covered in the buffers of found source packets.

(4) Repeat step (3) until all sent source packets are addressed.

(5) Transmit the XOR of all the packets which have been selected.

It is noted that the set of component source packets contains at most one lost packet for every UE. Upon receiving an XOR-constructed packet, a UE is able to recover one of its lost packets (if any) by XORing the currently received packet with some of its previously received packets.

When receiving an ACK from UEs, the base station removes the corresponding UE index from the appropriate buffer.

In the completing a burst transmission stage, until the index buffers are empty, the base station transmits a packet which is constructed by XORing several source packets. The indices of the set of component source packets can be determined by Algorithm C as described above. Upon receiving an ACK from UEs, the base station removes the corresponding UE index from the appropriate buffers. It is noted that Protocol 7 can be modified to meet additional latency requirements.

Transmission with Group-Based Buffers

Another protocol variation can be considered where each buffer may serve packets for multiple users, i.e., groups of UEs. The number of UEs that the system would support would in general be larger than the number of UE groups. Such a buffering scheme could be used when there is a limit on the buffering resources for lost packets.

The UEs can be grouped into a number of groups, each of which corresponds to a UE group buffer. The grouping can be either in a fixed pre-assignment or according to an adaptive group assignment procedure. Some of the criterion to group the UEs for buffering purposes may include: same or similar geographic locations, same or similar system delay quality of service (QoS) targets or service levels, same or similar system throughput (or bandwidth) QoS targets or service levels, same or similar channel erasure rates, same or similar subscription plans or payment plans, and any combinations of the above criteria. Additional grouping criteria may also be considered.

A buffering and retransmission scheme based on UE groups can be useful in a multicast situation where transmission would be considered sufficiently successful if any transmitted packet is received by at least one UE or a given minimum number, smaller than the size of the UEs group set, of UEs. Geographically close UEs may form a sub-network, whereby any UE that receives a multicast packet from the base station may be able to re-send such a packet via another air interface network, for example a local area cooperative wireless network, to the other UEs within the UE group.

There are two different methods of UE-group assignment that may be used, depending on how many UE groups any of the UEs can belong to. In a first case, hereinafter "Non-overlapping UE Groups Case," a UE may belong to only one UE group at any given time and any packets transmitted to that UE but are lost would be buffered to only one UE group buffer. It is noted that over a longer period of time, the mapping from the UE to a UE group, and to the corresponding UE group buffer, can be allowed to change. At any given time, the UE-group assignment is still fixed to one to one.

In a second case, a UE can belong to different user groups, so that packets intended for a particular UE but are lost can be buffered in more than one user group buffer at any given time. This is called the "Overlapping UE Groups Case".

Protocols whereby packets intended for multiple UEs that belong to different UE groups can be processed for Rateless Coding will be described.

Protocol 8

Using the "Non-overlapping UE Groups Case" for multiple UEs, Protocol 5 may be modified for the UE group based operation, and is referred to as Protocol 8. In general, Protocol 8 changes the buffer update rule, including flushing a UE group buffer of a packet if at least one ACK for that packet is received from any of the UEs belonging to the group.

Figure 4:
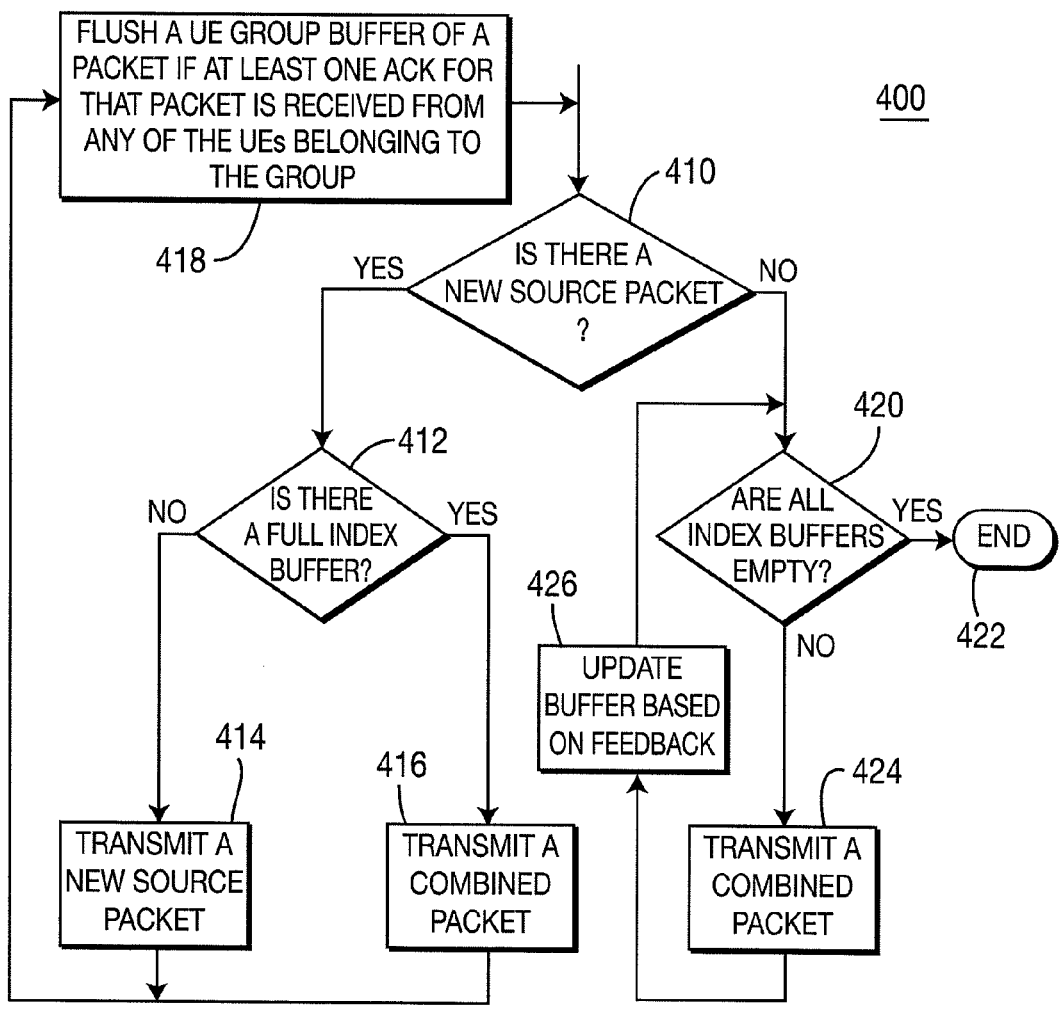
FIG. 4 is a flow chart of a transmission protocol with UE groups.

FIG. 4 is a flow chart of Protocol 8 400. The protocol 400 begins by determining whether there is a new source packet which has not yet been sent (step 410). If such a source packet exists, then a determination is made whether there is a full index buffer (step 412). If none of the index buffers are full, then the base station transmits a new source packet (step 414).

If one or more index buffers are full (step 412), then the base station transmits a combined packet which is a combination of several source packets with indices in the buffers (step 416). The base station then flushes a UE group buffer of a packet if at least one ACK for that packet is received from any of the UEs belonging to the group (step 418).

If there is no source packet which has not yet been received by both UEs (step 410), the base station flushes out the buffers. To flush out the buffers, a determination is made whether all index buffers are empty (step 420). If all the index buffers are empty, the protocol terminates (step 422). If all of the index buffers are not empty (step 420), then the base station transmits a combined packet, which is a combination of several source packets with indices in the buffers (step 424). The base station then updates the buffers based on ACK/NACK feedback received from the UEs (step 426).

Protocol 9

In the "Overlapping UE Group Buffers Case", protocols identical to the above can be still used. In this case, an identical packet may be buffered to two or more UE group buffers. Suppose a UE (A) belongs to two UE groups, UE Group 1 and UR Group 2. Suppose that when a packet P was sent to UE A, it was not received by any of the UEs in either of the UE groups. The same packet P will be introduced to the two different UE Group buffers, one for UE Group 1 and the other for UE Group 2. In a later retransmission (either combined or non-combined), the packet P is received by a UE (B) that belongs to UE Group 1 by not UE Group 2. In this case, only the buffer for the UE Group 1 will be flushed of the packet P.

Group assignment of any UE to any of the UE groups can be adaptively changed, using a base transceiver station, (BTS). The BTS may monitor the group-assignment metrics associated with a particular UE (such as experienced overhead, latency, memory, service-level, or any other criteria) and re-assign any UE to another group if the particular UEs metric values change such that the UE now is best assigned to another group.

It is noted that allowing updates to buffers (i.e., flushing out packets), even when not all UEs have received the packet and indicated so with an ACK, can be used in a situation that does not necessarily involve UE group based buffering and transmission. Instead, such a buffer update scheme can be used more generally with any type of buffering scheme, including those illustrated in Protocols 2, 3, 4, and 5, which are independent of the packet combination and/or retransmission protocols. By allowing buffers to be flushable before all UEs receive a packet, the system effectively allows erasures for some UEs. The benefits of such a buffer-flushing scheme include decreased latency and buffer memory requirements.

System Architecture to Support the Protocols

One aspect of successful adoption of any new algorithm in communication systems is the design of an appropriate system/protocol architecture (i.e., the associated signaling for information exchange) that is required to support the operation of the algorithm. Set forth below are aspects of a system architecture that would be common to most communication systems utilizing the Protocols described herein.

Packet Information Signaling Protocol

One problem that needs to be addressed is how to signal to the UEs which source packets are being included in which transmission packet.

Signaling Mechanisms

Several standard approaches can be used to signal which packets are transmitted. An associated control and indication channel, such as a High Speed Shared Control Channel (HS-SCCH) in High Speed Data Packet Access (HSDPA) is one example. The time instances of the associated signaling channels are aligned in a known fashion with those of the data carrying channel—e.g., the HS-SCCH transmission time intervals (TTIs) are two slots ahead of the high speed physical downlink shared channel (HS-PDSCH) TTIs for which the HS-SCCH carries information. Information about packets combined into a transmission are carried by the associated channel. Additional information may optionally be carried, including an indicator signaling whether a transmission is a new data packet or a retransmission; if different combining schemes may be used, a combining scheme indicator field; and if packets of varying length can be used, a length value or, more generally, a transport format indicator field.

Alternatively, such information may be embedded directly into the data channel in the form of a header.

Methods for Signaling

To signal which packets are being combined, it is assumed that packets are indexed. The index should be unique to at least a "super-frame" (in which case it is short and has a short repetition period) or a long packet index, such as a long sequence number, can be used.

For each transmission, the packet index of each packet combined into the transmission needs to be signaled. If a long sequence number is used, it may be shortened via an appropriate modulus operation when a packet is included for retransmission.

Several signaling methods can be used. First, the packet indexes and sequence numbers may be listed directly. The number of source packets combined into a single transmission may be restricted to avoid carrying too much control information on an associated control channel. Second, a bit field may be used, with one bit for each packet in a super-frame, with set bits indicating which packets are included in the current transmission. The bit field may be further run-length encoded using a high entropy coder such as a Huffman or arithmetic coder.

Synchronization Aspects and User Dynamics

Availability of synchronization signaling is used to support both robust system operation as well as user dynamics (a user entering/leaving multicast services). A method to establish and maintain synchronization is by establishing super-frame boundaries. A super-frame is a time interval (usually on the order of 100 mSec to a few seconds). For the purposes of retransmission, only packets within the same super-frame can be combined. The signaling protocol will generally contain a simple way to identify the start of a new super-frame. Thus, any UE that needs to establish or re-establish synchronization can always do so at the super-frame boundary.

Another alternative is that when transmitting multimedia data such as MPEG streams etc., the encoding includes some natural synchronization frames in which case the start of these frames may be used as a means of achieving synchronization.

Feedback Error Handling

The methods described herein assume that no errors occur in the feedback, which is of course unrealistic. The following modifications are required to ensure that the system can handle errors in feedback.

The algorithms described above assume that no errors occur in the feedback, which is unrealistic. The following modifications ensure that the system can handle errors in feedback.

While the specific algorithms described above assumed that both ACK and NACK signals are received from each UE and the feedback is tagged so that the UE which it came from can be identified, this is not necessary. In fact, several other possibilities exist, such as feeding back only NACK or only ACK, with the other being implicit. This is particularly useful when a shared random access channel is used for feedback.

The process by which feedback errors are addressed depends on the type of feedback.

Another possibility for the type of feedback is to use a block ACK and/or NACK. A block ACK/NACK would be useful in situations where the erasure rates are known to be sufficiently low in the system or relatively large latency can be tolerated. A block ACK, which is sent upon receiving a string of packets that are transmitted as a block, would contain multiple ACKs, each of which correspond to a received packet. For example, suppose that 10 multi-cast packets, numbered from 1 to 10, were transmitted from the base station. Suppose that UE "A" successfully received packets 1, 2, 3, 5, 7, 9 but did not receive packets 4, 6, 8, and 10. To indicate to the base station which packets were successfully received, UE "A" can send a block ACK for the 10 packets, in which it indicates that it has successfully received packets 1, 2, 3, 5, 7, and 9. Alternatively, UE "A" could also send a block NACK, indicating that packets 4, 6, 8, and 10 were not received.

Protocols and algorithms described above can be modified to transmit blocks of packets (including un-combined retransmitting and combined retransmitting) with block ACKs or block NACKs used for feedback. The modification would be that each UE's buffer would be updated on a block basis, in both 'packet inputting' and 'packet flushing' operations, instead of inputting or flushing one packet at a time. Thus, Protocol 5, for example, when used with a block-ACK situation, could be modified as shown in FIG. 5.

Figure 5:
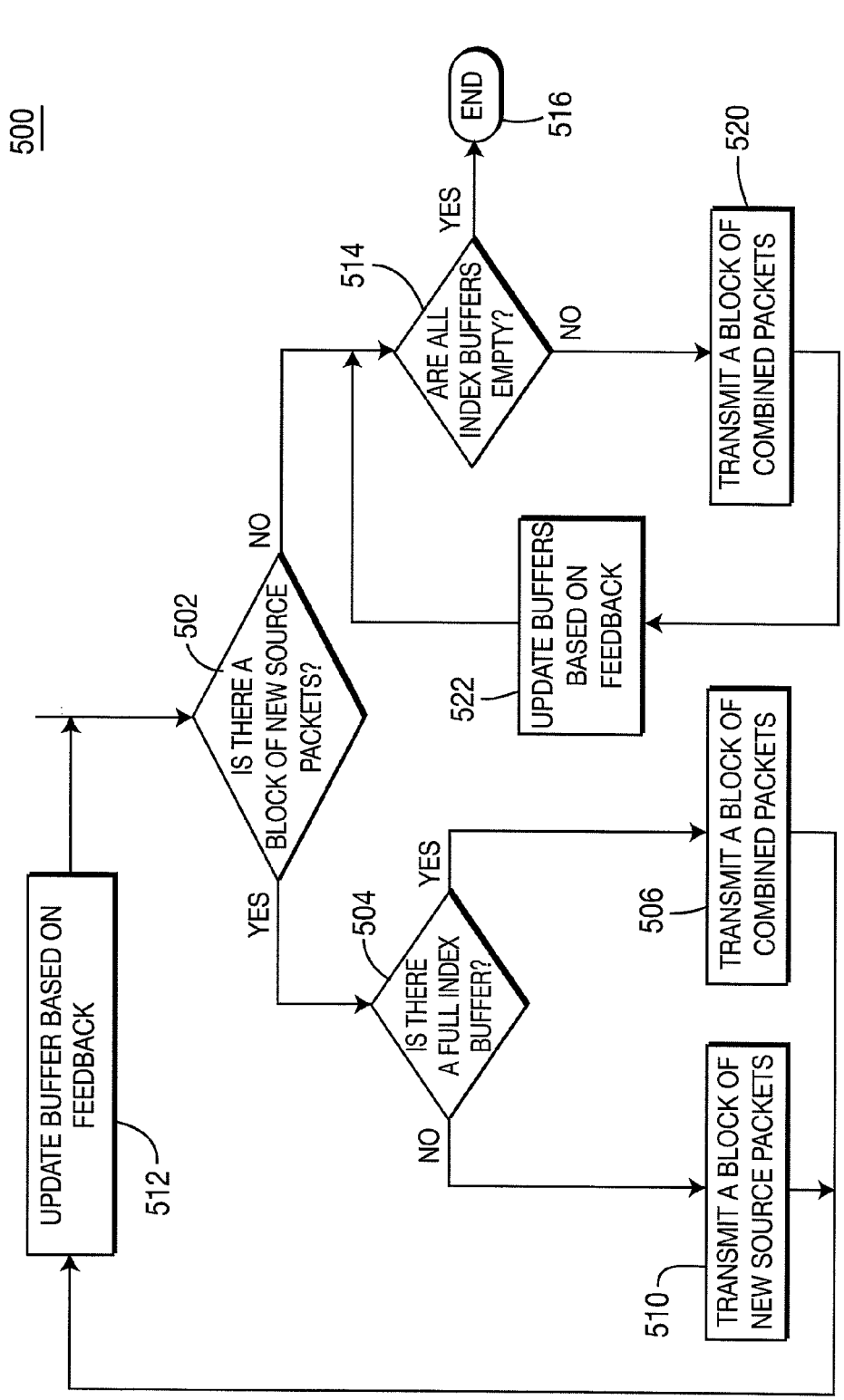
FIG. 5 is a flow chart of a transmission protocol with block packet transmission.

FIG. 5 is a flow chart of Protocol 5 500 modified for the block transmission case. The protocol 500 begins by determining whether there exists a new block of source packets which has not yet been sent (step 502). If a new block of source packets exists, then a determination is made whether there is a full index buffer (step 504). If there is a full index buffer, then a block of combined packets is transmitted (step 506). The packets can be combined in any manner previously described.

If there are no full buffers (step 504), then a block of new source packets is transmitted (step 510).

After transmitting a block of combined packets (step 506) or transmitting a block of new source packets (step 510), the buffers are updated based on the feedback received (step 512).

If there is no new block of source packets (step 502), then the base station attempts to flush out the buffers. To flush out the buffers, a determination is made whether all index buffers are empty (step 514). If all the index buffers are empty, then the protocol terminates (step 516). If all of the index buffers are not empty (step 514), then the base station transmits a block of combined packets (step 520). The packets can be combined in any manner previously described. The buffers are updated based on the feedback received (step 522) and a determination is made whether all of the index buffers are empty (step 514) and the protocol continues as described above.

It may be necessary to tune the false alarm/miss probability thresholds to balance the false alarm probability and the miss probability. The periodic full-information retransmission (maybe part of synchronization procedures) is helpful in correcting feedback errors.

A timer on the transmitter side may be used to imply a lack of successful reception in the case when an ACK or NACK is not received within the timer expiry time from sending the packet.

The situation that a source packet is retransmitted many times may happen in the protocols described above, especially when some channels have bad channel conditions. In this case, most of the retransmissions are aimed to help those UEs with worse channel conditions. The retransmission of source packets to the UEs with worse channel conditions impairs the overhead performance.

Existing solutions suggest restricting the number of retransmissions of the same source packet. In other words, if the number of retransmissions of a source packet reaches a certain upper bound, stop sending this packet. This limit can improve the overhead performance with the cost that not all UEs receive all packets. To do this, the base station needs to set up a retransmission counter for each source packet.

Variable Quality of Service (QOS) and Packet Classes

In some multicast services, the quality of service (QoS) of a UE may be different from another UE. In a wireless system, the QoS of a UE may depend on the UE's maximum throughput. Usually, a UE close to the cell center has a greater throughput than a UE close to the cell edge. Hence, the UE close to the cell center may require a high QoS level. The QoS of a UE may also depend on QoS class registration. Some UEs may register for a high QoS level, while others may register for a low QoS level.

There are two ways to meet the variable QoS requirements. The QoS may be controlled either on a per packet basis or within a packet. The protocols described above may be modified to work with variable QoS schemes, and such modifications are straightforward to those skilled in the art.

Per Packet QOS Level

The source packets can be categorized to variable classes. The source packets of each class must be delivered to a certain set of UEs, while it is acceptable if they are not delivered to other UEs in the system. In this case, the procedure for responding is similar to that described previously, except now the decision on successful reception is determined based upon the successful reception of the appropriate QoS class.

There are several options for encoding the class information. First, the information on the class of a source packet may be sent along with the data packet or the packet index through an associated control and indication channel. Second, a UE QoS or class may be negotiated/adapted with the transmitter based upon such factors as desired throughput, system loading, etc. Third, each UE then operates on its class of service and provides feedback only on those packets which are within its class. Alternatively, each UE just sends an ACK/NACK based on its reception. When receiving a NACK from a UE, the base station determines whether the missing packet is supposed to be delivered to that UE. If not, the base station ignores that NACK and adapts its retransmissions based upon the negotiated class of service.

Variable QOS within a Packet

Each source packet is partitioned into a separate set of bits according to each class of service. This may be achieved by adapting the coding, rate matching, and modulation scheme used for the various class of bits in a packet. The source data for each class must be delivered to a certain set of UEs, while it is acceptable if they are not delivered to other UEs in the system.

In this case, the procedure for responding is similar to that described above, except the decision on successful reception is determined based upon the successful reception of the appropriate QoS class bits.

There are several options for encoding the class information. First, the information on the class of a source packet may be sent along with the data packet or the packet index through an associated control and indication channel. Second, a UE QoS or class may be negotiated/adapted with the transmitter based upon such factors as desired throughput, system loading, etc. Third, each UE then operates on its class of service and provides feedback only on success or failure to receive those bits within a packet which are within its class.

In the case of adapting the modulation for different grades of QoS service, the option may be implemented as a hierarchical modulation scheme. In this case, the bits are directly encoded in a layered modulation process such that a receiver with a low QoS can successfully receive the bits as if they were encoded with a low order constellation. UEs with a high QoS service would be able to successfully receive with a high order constellation. For example, the low order constellation may be a QPSK scheme with two bits per symbol and the high order constellation may be a 16-QAM constellation scheme with four bits per symbol. Of these four bits, two bits are the same as those for the low order constellation.

This latter scheme may be used dynamically and each UE may selectively demodulate the data and provide feedback based upon the best effort demodulation process it can carry out.

Application to HSDPA

To illustrate the potential advantages of the algorithms described above to existing systems, the algorithm can be used to improve efficiency of transmission of multicast data over high-speed downlink packet access (HSDPA).

HSPDA Overview

According to Release 5 of the 3GPP specifications for wideband code division multiple access (WCDMA), four logical channels are involved in HSDPA operation: high-speed downlink shared channel (HS-DSCH), high-speed shared control channel (HS-SCCH), high-speed dedicated physical control channel (HS-DPCCH), and dedicated channel (DCH).

The HS-DSCH and its corresponding physical channel are used for user data multicast. The HS-SCCH in the downlink direction and HS-DPCCH in the uplink direction are two associated signaling channels which control the downlink user data transmissions. The DCH in both the downlink and the uplink directions is a signaling channel which can be used for any kind of service in Release 5. In Release 6, the DCH is replaced by an Enhanced DCH. In addition to the above four channels, there is a new channel in Release 6 specifications, the fractional dedicated physical channel (F-DPCH), to cover for operation when all downlink traffic is carried on the HS-DSCH.

One of the key technologies with HSDPA is physical layer retransmission. Whereas in Release 99 once data is not received correctly, the radio network controller (RNC) will schedule the retransmission. With HSDPA, the packet is first received in a buffer in the base transceiver station (BTS). The BTS keeps the packet in the buffer even if has sent it to the user and, in case of packet decoding failure, retransmission automatically takes places from the BTS without RNC involvement.

FIG. 6 is a diagram of the HS-DSCH channel encoding chain 600. According to FIG. 6, the information bits are first attached with the cyclic redundancy check (CRC) bits (step 610). The bit scrambling functionality (step 612) avoids long runs of the same bit. Next, code block segmentation occurs (step 614). Turbo coding occurs next (step 616); turbo codes are a unique type of channel codes used in HS-DSCH.

HARQ can be operated in two different ways: chase combining retransmission and incremental redundancy retransmission. In chase combining, the rate matching functionality is identical between transmissions and the same bits remain for retransmission. The receiver has to store received samples as soft values. In incremental redundancy, the rate matching between retransmissions is different. The relative number of parity bits to systematic bits varies between retransmissions. In actual implementation, channel encoding can be done for each packet transmission and the data can then be kept in the IR buffer.

In the hybrid-ARQ (HARQ) stage 650, first bit separation occurs (step 618). HARQ functionality consists of two-stage rate matching (steps 620 and 624), which allows tuning of the redundancy version of different retransmissions when using incremental redundancy. After the first rate matching stage (step 620), the information bit payload proceeds to an IR buffer (step 622). The second rate matching stage (step 624) then occurs. Physical channel segmentation (step 626) occurs, which is followed by interleaving, modulation, and physical channel mapping (step 628).

FIG. 7 shows the HS-DSCH channel decoding chain 700, which is almost the opposite direction of the encoding chain 600. The only extra block in FIG. 7 is the combining block (step 714), which performs the chase combining or the incremental redundancy operation. In the decoding process, interleaving, modulation, and physical channel mapping (step 710) occur first. Following this stage physical channel segmentation occurs (step 712). Combining (step 714) occurs next, followed by the information bit passing through an IR buffer (step 716). If the punctured turbo codewords are successfully decoded, a first rate matching stage (step 718) begins, else combining (step 714) occurs again until the punctured turbo codewords are successfully decoded. Bit separation (step 720) occurs next followed by turbo decoding (step 722), code block segmentation (step 724), bit scrambling (step 726), and CRC attachment (step 728).

Combining Packets in HSDPA

The HSDPA specifications satisfy the requirements of the multicast models described above. The HS-DSCH and HS-DPCCH are the downlink transport channel and the uplink signaling channel in HSDPA, respectively. The former channel can serve as the multicast channel and the latter channel can serve as the ACK/NACK feedback channel in the multicast model.

HSDPA offers more than the multicast model. In HSDPA, if a packet is not decoded correctly, instead of discarding it, the packet is stored for further decoding use. This decreases the decoding failure rate for the retransmitted packets. It is improper for the multicast model to assume that the erasure channel has a constant average erasure rate for all the packets sent. The average erasure rate can be set as a function of the number of retransmissions. For example, the average erasure rate for the initial packet is $e_0$, the average erasure rate for the first retransmission packet is $e_1$, and the average erasure rate for the second retransmission packet is $e_2$, where $e_2 < e_1 < e_0$.

The protocols described above can be applied to the HSDPA environments. The example of multicasting data streams to two UEs as described in Protocol 2 is discussed for purposes of simplicity. This example could be extended to the case of multiple UEs. The channel coding and HARQ operations in HSDPA are not covered by Protocol 2. The packet XOR operation in Protocol 2 is new to HSDPA.

To adapt Protocol 2 for use with HSDPA, the following changes are made. In the buffer, with HARQ, all transmitted packets in HSDPA are automatically stored in the IR buffer for potential retransmission. Hence, it is unnecessary for the two buffers in Protocol 2 to store the whole missing packets. Instead, these two buffers simply record the indices of the missing packets. A packet is removed from the IR buffer if the BTS receives ACKs from both UEs for this packet.

When transmitting a source packet according to Rule 1 or Rule 3 of Protocol 2, the BTS follows the HS-DSCH channel encoding chain 600 in FIG. 6 to generate an outgoing packet.

A UE follows the HS-DSCH channel decoding chain 700 in FIG. 7 to decode a received source packet.

When transmitting a combined packet according to Rule 2 of Protocol 2, if the buffers for both UEs are non-empty, the BTS transmits the XOR of the first packets in these two buffers. There are two approaches to XORing packets in HSDPA.

Figure 8:
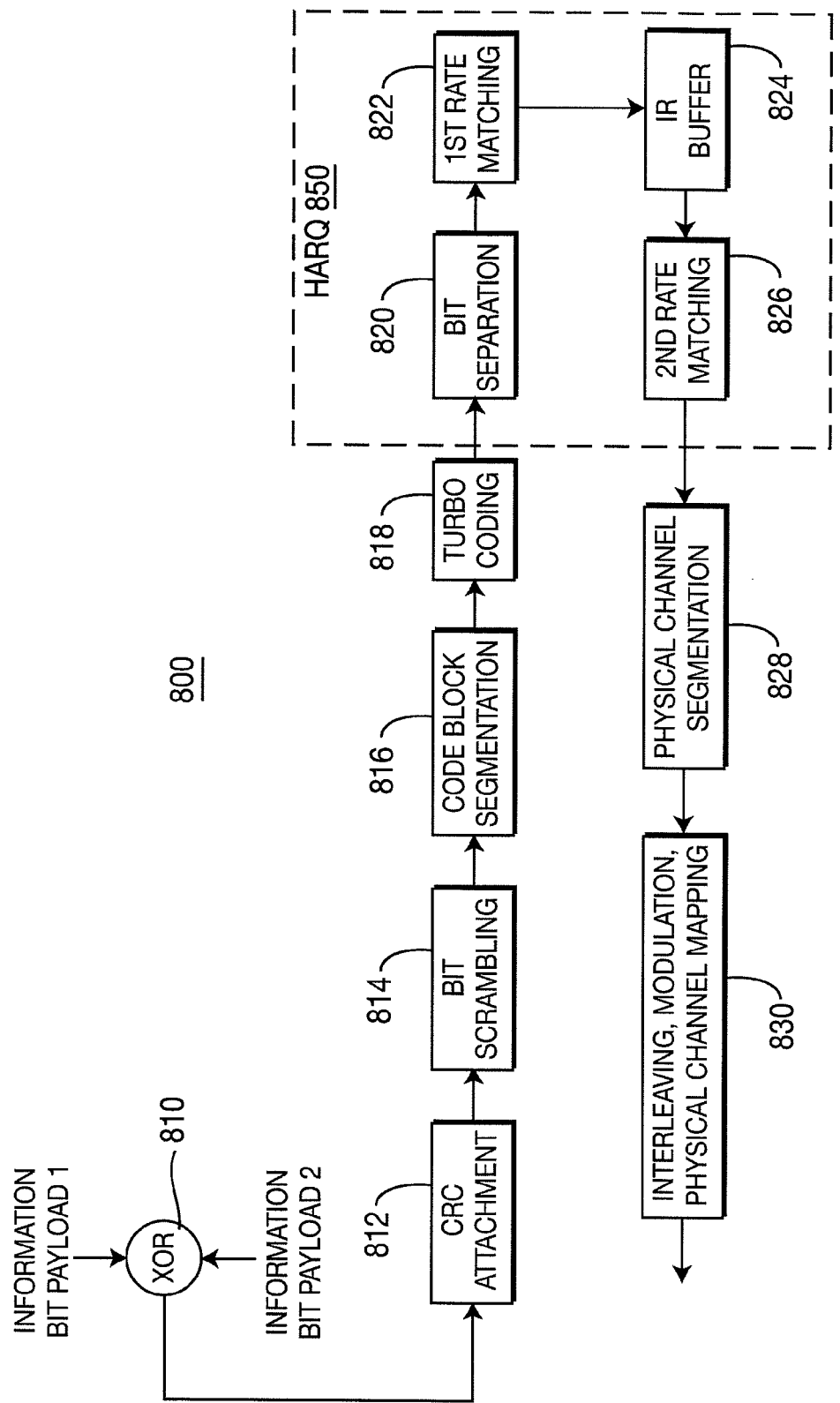
FIG. 8 is a diagram of an HS-DSCH channel encoding chain for a combined packet.

A first approach is to XOR before Turbo encoding. The XOR operation can be performed at any step from the original source packet to the beginning of the Turbo encoding block. FIG. 8 shows an example of XORing information bits at the beginning of the CRC block.

FIG. 8 is a flow diagram of an HS-DSCH channel encoding chain 800 for a combined packet. The HS-DSCH channel encoding chain for a combined packet 800 begins with XORing packets (step 810). CRC attachments are then made (step 812), followed by bit scrambling (step 814), and code block segmentation (step 816). Turbo Coding is then performed (step 818). HARQ operations 850 are then commenced, starting with bit separation (step 820). A first rate matching sequence (step 822) then begins followed by data passing through an IR buffer (step 824) and then a second rate matching sequence (step 826). Physical channel segmentation (step 828) then occurs followed by interleaving, modulation, and physical channel mapping (step 830).

A second approach is to XOR after Turbo encoding. The XOR operation can be performed at any step from the output of the Turbo encoding block to the IR buffer block. Since all transmitted packets in HSDPA are automatically stored in the IR buffer, it is convenient to XOR the bits of the two missing packets which are stored in the IR buffer.

If a systematic Turbo code is used in HSDPA, then the combined packets generated through the above two approaches are identical.

To decode a combined packet, upon receiving the combined packet, a UE first creates the replication of the known source packets, which are components of the combined packet. Then the UE XORs these known packets with the received combined packet. The resulting single unknown packet is then demodulated through the receive chain. As previously mentioned, the packet extraction may occur at any place in the receive chain, but the most natural place to perform the packet extraction is in the IR buffer, prior to the first rate de-matching and Turbo decoding.

Figure 9:
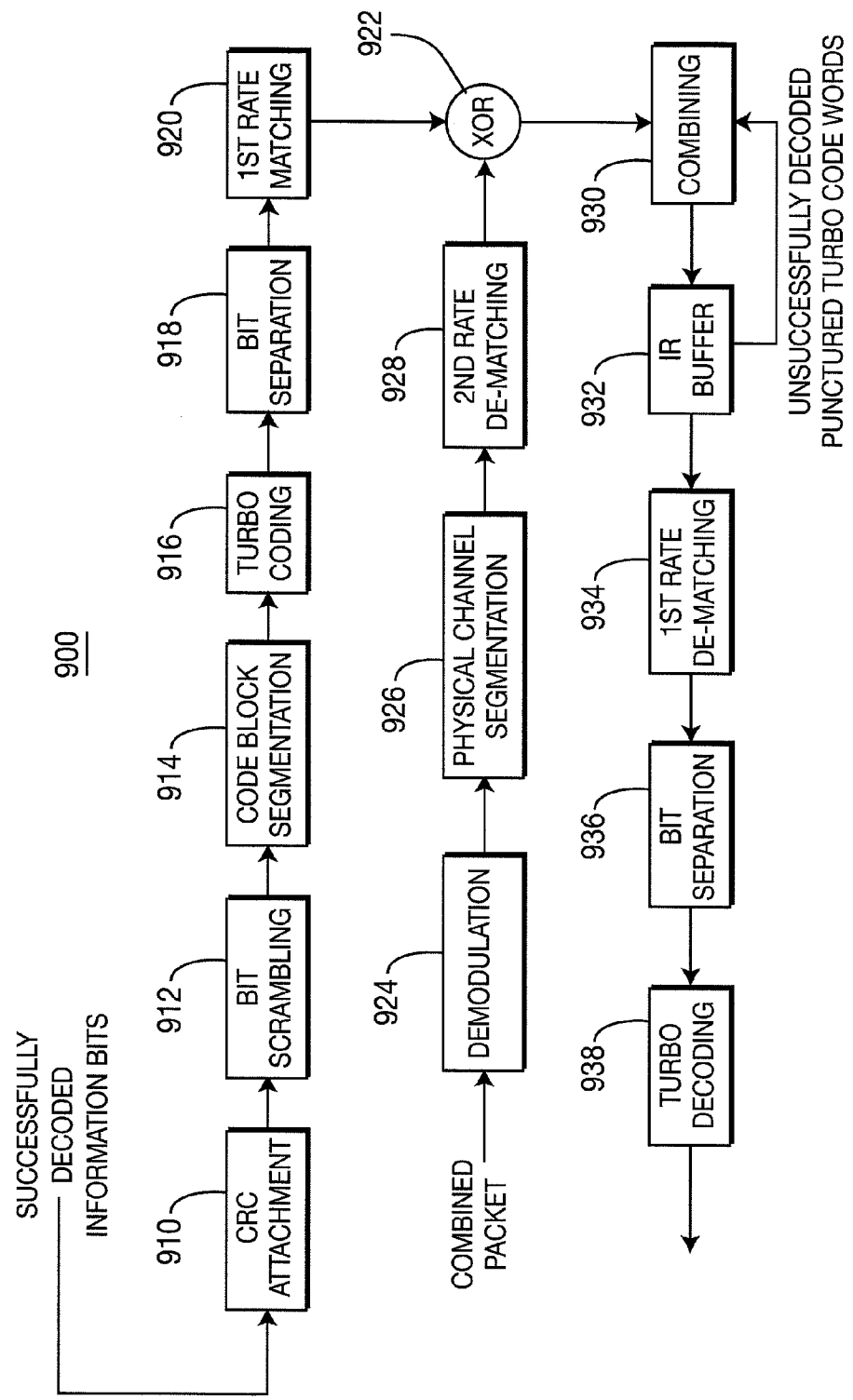
FIG. 9 is a diagram of an HS-DSCH channel decoding chain for a combined packet.

FIG. 9 is a diagram of an HS-DSCH channel decoding chain 900 for a combined packet. In the decoding chain 900, the source packet(s) which is a component of the combined packet is first CRC attached (step 910). It is followed by bit scrambling (step 912), code block segmentation (step 914), Turbo coding (step 916), bit separation (step 918), and a first rate matching process (step 920). A combined packet simultaneously can be demodulated (step 924), then go through physical channel segmentation (step 926) and then onto a second rate de-matching process (step 928) before XORing (step 922). Combining (step 930) then occurs followed by storage in an IR buffer (step 932). If the punctured turbo codeword is successfully decoded, a first rate de-matching process (step 934) occurs, else the combining (step 930) occurs again with the unsuccessfully decoded punctured Turbo codewords. Following the first rate de-matching sequence (step 934), bit separation (step 936) and Turbo decoding (step 938) occurs.

Protocol 10

The new protocol for HSDPA includes the BTS setting up an index buffer for each UE. Each index buffer records the indices of packets that have been sent, but not received by the corresponding UE. Both buffers are empty at the beginning. Although this protocol is described for two UEs, extensions to an arbitrary number of UEs should be clear.

There are two stages in Protocol 10: the "normal transmission stage" and the "completing a burst transmission stage". If there exists a new source packet which has not been sent before or both buffers are non-empty, then the protocol is in the "normal transmission stage". Otherwise, the protocol is in the "completing a burst transmission stage".

In the normal transmission stage, the BTS generates and multicasts a packet according to the following rules of order.

Rule 1: If both UEs informed the BTS of the failure of decoding a common packet, the BTS generates a retransmission packet as described above. In Chase combining, the retransmission packet is the same as the original packet. In incremental redundancy, the retransmission packet is a different puncturing of the Turbo codeword. When receiving an ACK from one UE and a NACK from the other UE, the BTS adds the packet index into the buffer for the latter UE.

Rule 2: If the buffers for both UEs are non-empty, the BTS generates a combined packet through the approaches described above. Upon receiving an ACK from one or both UEs, the BTS removes the first packet index reference from the appropriate buffer(s).

Rule 3: The BTS transmits a new packet as described above. When receiving an ACK from one UE and a NACK from the other UE, the BTS adds the packet index into the buffer for the latter UE.

In the completing a burst transmission stage, at the end of a long transmission burst, at least one UE has been able to decode all source packets. If the other UE has not yet decoded all source packets, i.e., the buffer for that UE is non-empty, then the BTS flushes out the buffer. Specifically, the BTS keeps retransmitting all the packets with indices in the buffer until it receives an ACK from the UE. Then the BTS sends the next packet with an index in the buffer.

Simulation Results

Figure 10:
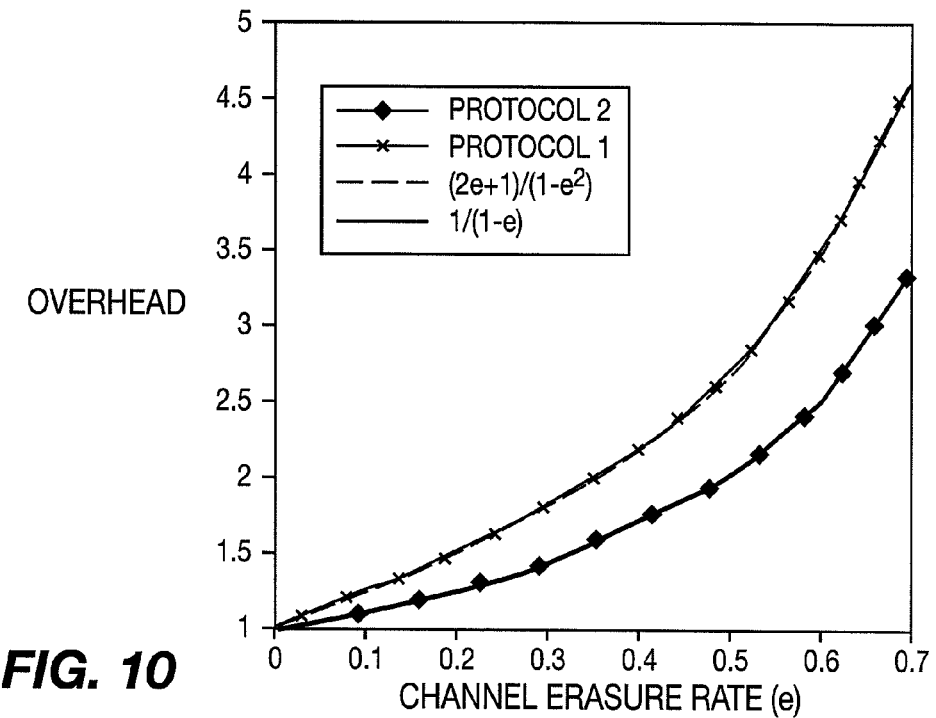
FIG. 10 is a graph of a first simulation comparing different protocol results on the two UEs case.

FIG. 10 is a graph of a first simulation comparing the overheads of Protocol 1 and Protocol 2 versus channel erasure rate for the multicast model with two UEs. The simulations assume that the erasure rates of the two independent erasure channels are identical. Let e denote the identical erasure rate. For comparison purposes, two curves are plotted $$\frac{2e+1}{1-e^2}$$

(hereinafter "Curve A") and $$\frac{1}{1-e}$$

(hereinafter "Curve B") in FIG. 10. The former curve is derived from Equation (3) showing the expected overhead of Protocol 1, and the latter curve is derived from Equation (5) showing the minimum possible overhead of any protocol for the multicast model with two UEs.

In the simulations, the number of source packets is set as $10^4$. Each point in the curves is an average of 20 independent runs, and the variance of each point is less than $1\times10^{-3}$. It is seen from FIG. 10 that the overhead of Protocol 1 almost overlaps Curve A, and the overhead of Protocol 2 almost overlaps Curve B. In other words, Protocol 2 achieves the best overhead performance. It makes the transmission of the same data to the second user for free.

Figure 11:
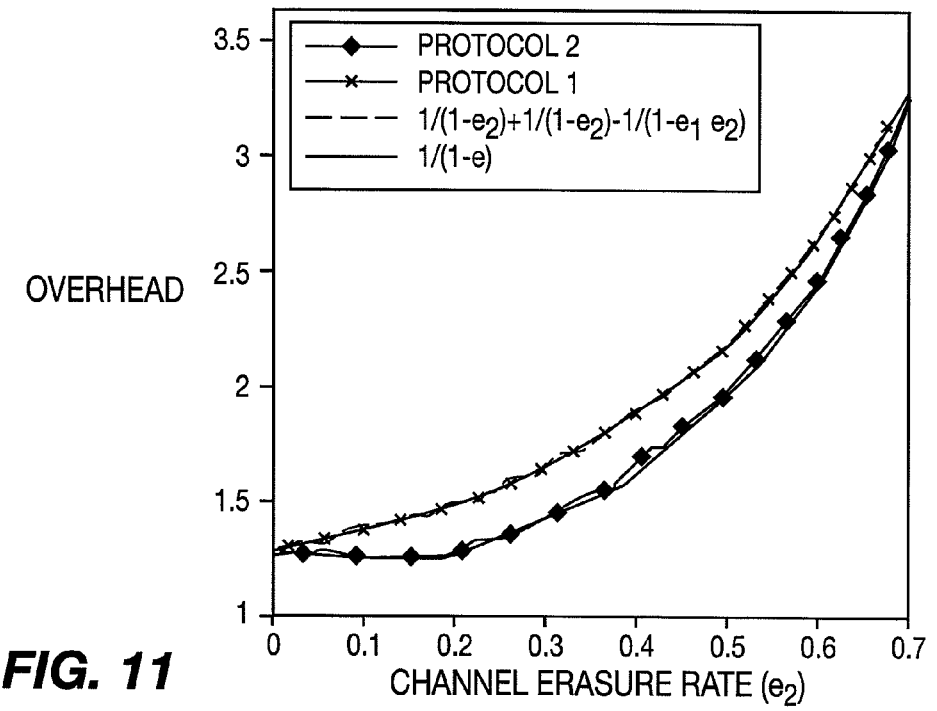
FIG. 11 is a graph of a second simulation comparing different protocol results on the two UEs case.

FIG. 11 is a graph showing the overheads of Protocol 1 and Protocol 2 versus channel erasure rate $e_2$, while the channel erasure rate $e_1$ is fixed at 0.2. For comparison purposes, two curves based on Equations (3) and (5) with $e_1=0.2$ are plotted in the same figure. It is seen from FIG. 11 that the overhead of Protocol 1 almost overlaps the curve of Equation (3) and the overhead of Protocol 2 almost overlaps the curve of Equation (5). The overhead of Protocol 2 outperforms that of Protocol 1, although the gap is not as large as the case of $e_1=e_2$. It is noted that the curve of Equation (3) approaches the curve of Equation (5) at a high $e_2$ value.

Figure 12:
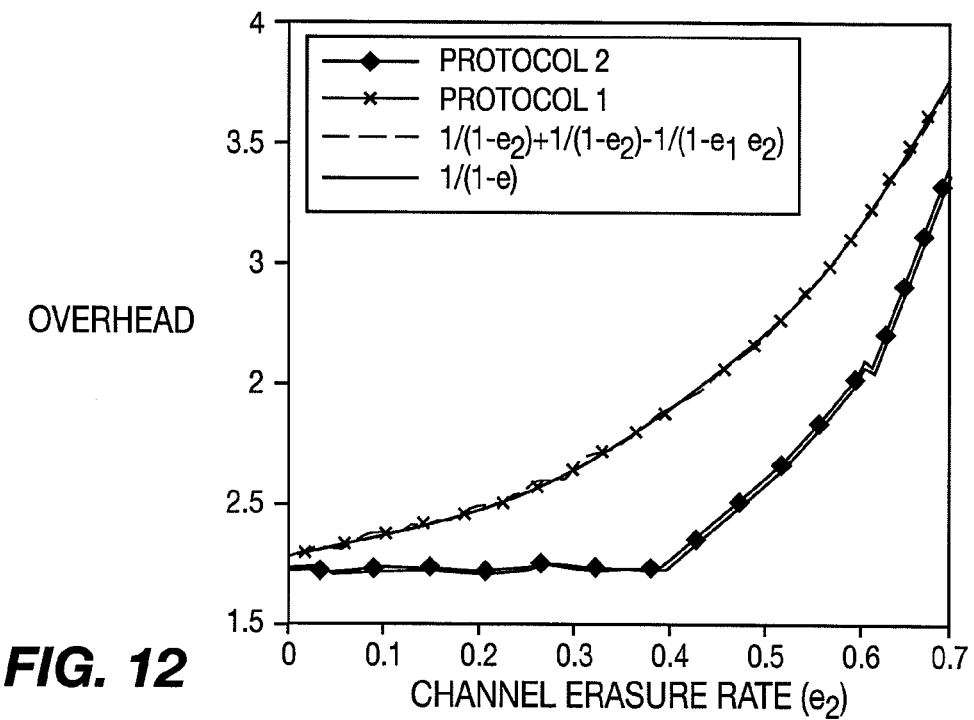
FIG. 12 is a graph of a third simulation comparing different protocol results on the two UEs case.

FIG. 12 is a graph showing the overheads of Protocol 1 and Protocol 2 versus channel erasure rate $e_2$, while the channel erasure rate $e_1$ is fixed at 0.4. Similar results as in FIG. 11 can be observed.

Figure 13:
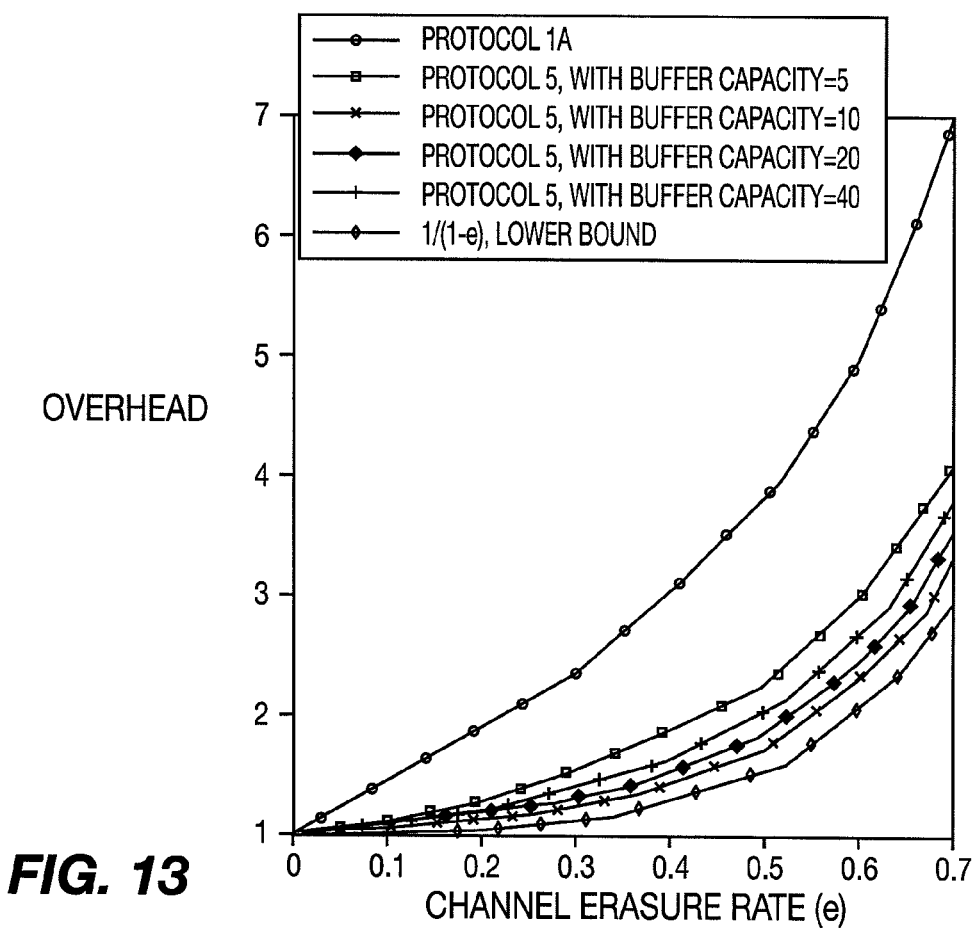
FIG. 13 is a graph of a first simulation comparing different protocol results on the multiple UEs case.

FIG. 13 is a graph of the simulation results on the overheads of Protocol 1a and Protocol 5 for the multicast model with five UEs. The channel erasure rates of all five channels are assumed to be the same in the simulations. For comparison purposes, a lower bound is drawn on the overhead, i.e., $$\frac{1}{1-e},$$

in FIG. 13. It is seen from FIG. 13 that the overhead of Protocol 5 decreases with the buffer capacity. This is because with a larger buffer capacity, each combined packet is likely to contain one packet of unknown information for more UEs. As the buffer capacity increases, the overhead of Protocol 5 approaches the lower bound $$\frac{1}{1-e}.$$

The buffer capacity used in the simulation is small compared with the number of source packets. Furthermore, the buffers store the packet indices only, rather than the whole packets. Hence, the storage requirements of Protocol 5 can be easily satisfied by the base station.

Figure 14:
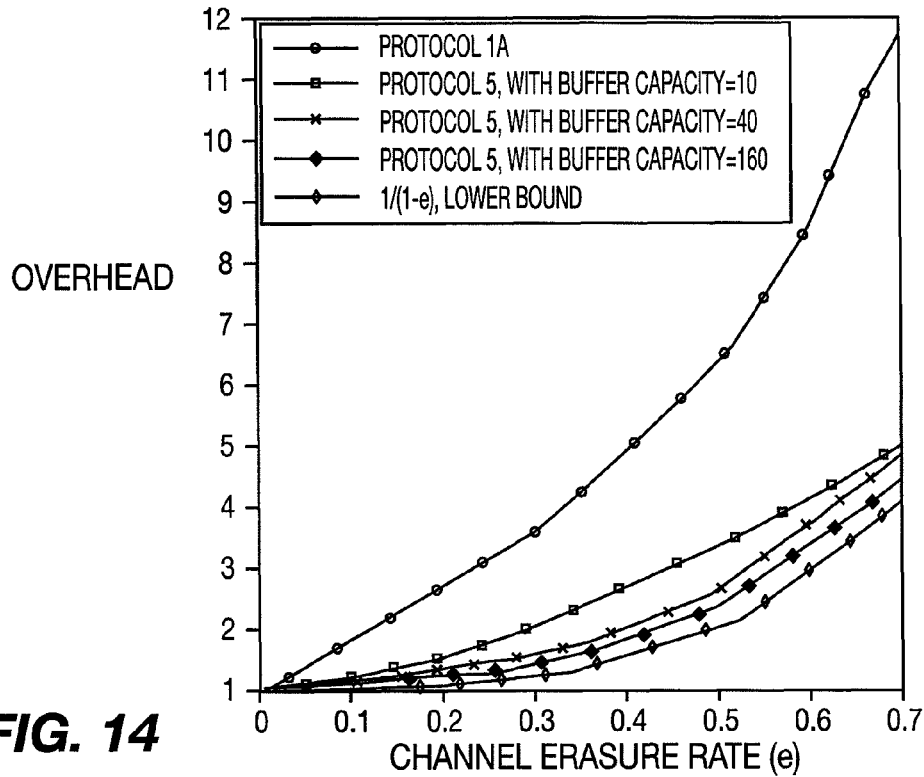
FIG. 14 is a graph of a second simulation comparing different protocol results on the multiple UEs case.
Figure 15:
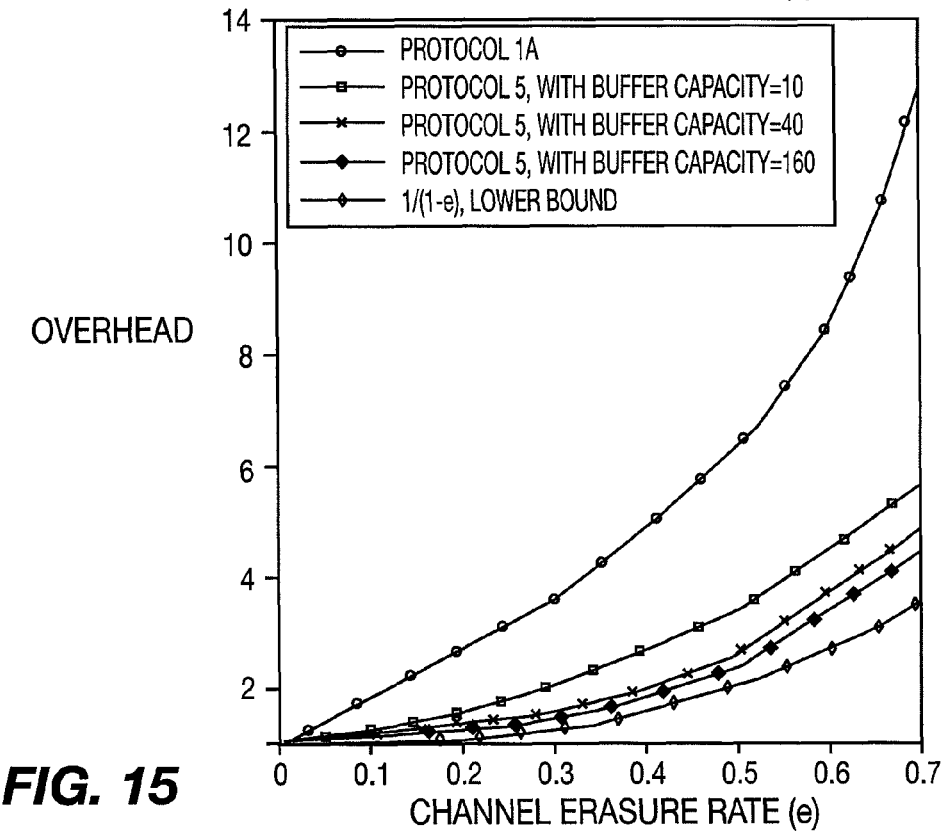
FIG. 15 is a graph of a third simulation comparing different protocol results on the multiple UEs case.

FIG. 14 and FIG. 15 are graphs showing the simulation results on the overheads of Protocol 1a and Protocol 5 with 25 and 50 UEs, respectively. Again, the channel erasure rates of all these channels are assumed to be the same in the simulations. A large performance improvement can be observed by using Protocol 5 over Protocol 1a.

Although the features and elements of the present disclosure are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (UE), user equipment (UE), terminal, base station, radio network controller (RNC), or any host computer. The UE may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for multicasting a packet, comprising:
providing a buffer at a base station for each of two user equipments (UEs) in communication with the base station, each buffer configured to store packets to be sent to the corresponding UE;
determining whether there is a new packet at the base station to be transmitted to a UE, wherein a new packet is a previously unsent packet;
determining whether both UE buffers are non-empty;
flushing a non-empty buffer on a condition that there is no new packet and on a condition that one of the buffers is non-empty;
selecting a packet to transmit on a condition that there is a new packet or on a condition that both buffers are non-empty, wherein a combined packet is selected on a condition that there is no packet that has been previously transmitted but not acknowledged by both UEs and on a condition that both buffers are non-empty, wherein a combined packet is an exclusive OR combination of a first packet in each buffer; and
updating the buffers based on feedback received from the UEs, wherein the updating includes removing a packet from a buffer on a condition that the UE acknowledges receipt of the packet.

2. The method according to claim 1, wherein the flushing includes:
determining whether the buffer is empty;
transmitting a packet from the buffer on a condition that the buffer is non-empty;
updating the buffer based on feedback received from the UE, wherein the updating includes removing a packet from a buffer on a condition that the UE acknowledges receipt of the packet; and
repeating the flushing until the buffer is empty.

3. The method according to claim 1, wherein the selecting includes:
transmitting a packet that has been previously transmitted but not acknowledged by both UEs.

4. The method according to claim 1, wherein the selecting includes:
transmitting a new packet on a condition that there is no packet that has been previously transmitted but not acknowledged by both UEs and on a condition that one of the buffers is empty.

5. The method according to claim 1, wherein the selecting includes:
examining a first packet in a non-empty buffer;
determining whether the first packet is a predetermined number of packets ahead of a most recently transmitted packet; and
transmitting the first packet on a condition that the first packet is the predetermined number of packets ahead of the most recently transmitted packet.

6. The method according to claim 5, wherein the predetermined number of packets ahead of the most recently transmitted packet corresponds to a maximum delay value.

7. The method according to claim 1, wherein the selecting includes transmitting a first packet in the buffer on a condition that the buffer has reached a predetermined buffer capacity.

8. A method for providing feedback in a multicast communication system, comprising:
receiving a packet from a base station;
determining whether the received packet is a combined packet;
recovering individual packets from the combined packet, wherein the recovering includes performing an exclusive OR operation on the combined packet and a previously received packet, whereby a previously unsuccessfully received packet is recovered; and
providing feedback to the base station for any individual packet in the combined packet that was not previously successfully received.

9. A base station configured to multicast a packet, comprising:
two buffers, one buffer for each of two user equipments (UEs) in communication with the base station;
a processor configured to:
determine whether there is a new packet to be transmitted to a UE, wherein a new packet is a previously unsent packet; and
determine whether both buffers are non-empty;
a buffer flushing device configured to flush a non-empty buffer on a condition that there is no new packet and on a condition that one of the buffers is non-empty;
a packet selector configured to
select a packet to transmit on a condition that there is a new packet or on a condition that both buffers are non-empty;
select a combined packet on a condition that there is no packet that has been previously transmitted but not acknowledged by both UEs and on a condition that both buffers are non-empty, wherein a combined packet is an exclusive OR combination of a first packet in each buffer;
a buffer updating device configured to:
update the buffers based on feedback received from the UEs; and
remove a packet from a buffer on a condition that the packet has been acknowledged by the corresponding UE; and
a transceiver configured to transmit packets and to receive feedback information.

10. The base station according to claim 9, wherein said buffer flushing device is configured to:
determine whether the buffer is empty;
select a packet from the buffer for transmission on a condition that the buffer is not empty; and
repeat flushing the buffer until the buffer is empty.

11. The base station according to claim 9, wherein said packet selector is configured to select a packet that has been previously transmitted but not acknowledged by both UEs.

12. The base station according to claim 9, wherein said packet selector is configured to select a new packet on a condition that there is no packet that has been previously transmitted but not acknowledged by both UEs and on a condition that one of said buffers is empty.

13. The base station according to claim 9, wherein said packet selector is configured to:
examine a first packet in a non-empty buffer;
determine whether the first packet is a predetermined number of packets ahead of a most recently transmitted packet; and
select the first packet on a condition that the first packet is the predetermined number of packets ahead of the most recently transmitted packet.

14. The base station according to claim 13, wherein the predetermined number of packets ahead of the most recently transmitted packet corresponds to a maximum delay value.

15. The base station according to claim 9, wherein said packet selector is configured to select a first packet in the buffer on a condition that the buffer has reached a predetermined buffer capacity.

* * * * *